United States Patent
Kwon et al.

(10) Patent No.: US 12,273,608 B2
(45) Date of Patent: Apr. 8, 2025

(54) FOLDED MODULE AND CAMERA MODULE INCLUDING FOLDED MODULE

(71) Applicant: SAMSUNG ELECTRO-MECHANICS CO., LTD., Suwon-si (KR)

(72) Inventors: Young Hwan Kwon, Suwon-si (KR); Nam Ki Park, Suwon-si (KR); Young Bok Yoon, Suwon-si (KR); Soon Seok Kang, Suwon-si (KR); Jae Won Jung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/541,314

(22) Filed: Dec. 15, 2023

(65) Prior Publication Data

US 2024/0114221 A1 Apr. 4, 2024

Related U.S. Application Data

(63) Continuation of application No. 17/583,779, filed on Jan. 25, 2022, now Pat. No. 11,889,169.

(30) Foreign Application Priority Data

Feb. 26, 2021 (KR) .................. 10-2021-0026736
Jun. 7, 2021 (KR) .................. 10-2021-0073616

(51) Int. Cl.
*H04N 5/335* (2011.01)
*H04N 23/51* (2023.01)
(Continued)

(52) U.S. Cl.
CPC ............ *H04N 23/51* (2023.01); *H04N 23/54* (2023.01); *H04N 23/55* (2023.01)

(58) Field of Classification Search
CPC ..................................................... H04N 23/51
See application file for complete search history.

(56) References Cited

U.S. PATENT DOCUMENTS

| 10,866,430 B2 | 12/2020 | Kim et al. |
| 2004/0105025 A1* | 6/2004 | Scherling ............... G03B 17/17 348/E5.025 |

(Continued)

FOREIGN PATENT DOCUMENTS

| CN | 109725474 A | 5/2019 |
| CN | 209590407 U | 11/2019 |

(Continued)

OTHER PUBLICATIONS

Chinese Office Action issued on Mar. 19, 2024, in counterpart Chinese Patent Application No. 202210149572.0 (4 pages in English, 6 pages in Chinese).

(Continued)

*Primary Examiner* — Gary C Vieaux
(74) *Attorney, Agent, or Firm* — NSIP Law

(57) ABSTRACT

A camera module includes a housing, a reflective member positioned in the housing and changing a direction of light to a direction of an optical axis, a carrier carrying the reflective member and rotatable about a first axis with respect to the housing, and a first ball group disposed between the housing and the carrier, wherein the first ball group includes a main ball member providing the first axis of the carrier, and an auxiliary ball member disposed away from the first axis, and one or both of the housing and the carrier partially accommodates the auxiliary ball member, and includes an auxiliary guide groove extended in a circumferential direction of the first axis.

12 Claims, 26 Drawing Sheets

(51) Int. Cl.
*H04N 23/54* (2023.01)
*H04N 23/55* (2023.01)

(56) References Cited

U.S. PATENT DOCUMENTS

| 2015/0002683 | A1  | 1/2015  | Hu et al. |
| 2018/0024329 | A1* | 1/2018  | Goldenberg ............ H04N 23/45 |
| 2018/0239161 | A1* | 8/2018  | Seol ..................... G02B 27/646 |
| 2019/0121103 | A1* | 4/2019  | Bachar ............... G02B 13/0065 |
| 2019/0129197 | A1  | 5/2019  | Kim et al. |
| 2020/0028999 | A1  | 1/2020  | Jun |
| 2020/0301246 | A1  | 9/2020  | Seo et al. |
| 2020/0363626 | A1* | 11/2020 | Seo ........................ G03B 30/00 |
| 2020/0400464 | A1* | 12/2020 | Yedid ................... G02B 7/1827 |
| 2022/0030168 | A1  | 1/2022  | Chang et al. |

FOREIGN PATENT DOCUMENTS

| CN | 209992790 U     | 1/2020  |
| EP | 3 584 624 A1    | 12/2019 |
| KR | 10-2018-0003539 A | 1/2018 |
| KR | 10-1942743 B1   | 1/2019  |
| KR | 10-2020-0001243 A | 1/2020 |
| KR | 10-2166942 B1   | 10/2020 |
| KR | 10-2020-0125629 A | 11/2020 |
| KR | 10-2185060 B1   | 12/2020 |
| WO | WO 2019/207464 A2 | 10/2019 |

OTHER PUBLICATIONS

Indian Office Action issued on Sep. 9, 2022, in counterpart Indian Patent Application No. 202214005133 (5 pages in English).
Korean Office Action Issued on Nov. 28, 2022, in counterpart Korean Patent Application No. 10-2021-0073616 (6 Pages in English, 5 Pages in Korean).
Indian Office Action Issued on Apr. 21, 2023, in Counterpart Indian Patent Application No. 202214005133 (2 Pages in English).

* cited by examiner

FOLDED MODULE AND CAMERA MODULE INCLUDING FOLDED MODULE

CROSS-REFERENCE TO RELATED APPLICATIONS

This application is a continuation of U.S. patent application Ser. No. 17/583,779 filed on Jan. 25, 2022, now U.S. Pat. No. 11,889,169 issued on Jan. 30, 2024, which claims the benefit under 35 USC 119 (a) of Korean Patent Application Nos. 10-2021-0026736 filed on Feb. 26, 2021, and 10-2021-0073616 filed on Jun. 7, 2021, in the Korean Intellectual Property Office, the entire disclosures of which are incorporated herein by reference for all purposes.

BACKGROUND

1. Field

The present disclosure relates to a camera module, and more particularly, to a camera module including a reflective member changing an optical path of light.

2. Description of the Background

A camera module may be installed in a portable electronic device such as a tablet personal computer (PC) or a laptop computer as well as a smartphone. An autofocus (AF) function, an optical image stabilization (OIS) function, a zoom function and the like may be added to the camera module for a mobile terminal.

In addition, the camera module may include an actuator that directly moves a lens module or indirectly moves a reflective module including a reflective member for stabilizing an unstable optical image. In addition, the actuator may move the lens module or the reflective module in a direction intersecting an optical axis direction using driving force generated by a magnet and a coil.

In recent years, demand for video capturing has rapidly increased. However, when the video being captured is continuously unstable, for example, the prior art has had difficulty in accurately stabilizing such unstable video.

In addition, it may be inconvenient that when a subject to be captured moves during capturing of a video thereof, a user is required to directly move the user's mobile communication terminal to adjust a direction in which the camera module captures a subject to this moving subject, and the user may also have difficulty in accurately capturing the video.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing, a reflective member disposed in the housing and changing a direction of light to a direction of an optical axis, a carrier carrying the reflective member and rotatable about a first axis with respect to the housing, and a first ball group disposed between the housing and the carrier, wherein the first ball group includes a main ball member providing the first axis of the carrier, and an auxiliary ball member disposed away from the first axis, and wherein one or both of the housing and the carrier partially accommodates the auxiliary ball member, and includes an auxiliary guide groove extended in a circumferential direction of the first axis.

Both the housing and the carrier may partially accommodate the auxiliary ball member, and the auxiliary guide groove may include a first auxiliary guide groove positioned in the carrier and a second auxiliary guide groove positioned in the housing.

A length of the second auxiliary guide groove may be at least twice the length of the first auxiliary guide groove.

The auxiliary guide groove may support the auxiliary ball member at one point.

The auxiliary guide groove may be positioned for the auxiliary ball member to be moved in the auxiliary guide groove in a radial direction of the first axis.

The auxiliary guide groove may include a bottom surface and a wall surface extended to each side thereof from the bottom surface, and may be positioned for the auxiliary ball member to be spaced apart from the wall surface or to be in contact with the wall surface at one point.

The wall surface may have a curved surface.

The auxiliary guide groove may have an arc-shaped cross-section.

A curvature radius of the cross-section may be larger than a radius of the auxiliary ball member.

A diameter of the main ball member may be different from a diameter of the auxiliary ball member.

The diameter of the main ball member may be larger than the diameter of the auxiliary ball member.

The camera module may further include a magnet disposed in the carrier, and a yoke disposed in the housing to face the magnet.

The auxiliary ball member may include two or more auxiliary ball members, and the magnet may be positioned for a magnetic attraction generated between the magnet and the yoke to pass through the inside of a region connecting the main ball member and two or more auxiliary ball members to one another.

The magnet may have a shape of a donut extended in the circumferential direction of the first axis, and may have a portion of an outer edge parallel to a line intersecting the first axis and perpendicular to the optical axis.

The magnet may have a shape of a donut extended at an angle of 90 degrees or more in the circumferential direction of the first axis with respect to a line parallel to the optical axis and intersecting the first axis.

The camera module may further include a second magnet disposed in the carrier, wherein the second magnet may include a cylindrical surface having a central axis spaced apart from and parallel to the first axis.

The camera module may further include a lens module refracting the light incident from the reflective member in the direction of the optical axis, and an image sensor module converting the light refracted by the lens module into an electrical signal.

In another general aspect, a camera module includes a housing, a reflective member disposed in the housing and changing a direction of light to a direction of an optical axis, a carrier carrying the reflective member and rotatable about a first axis with respect to the housing, and a first ball group disposed between the housing and the carrier, wherein the first ball group includes a main ball member providing the first axis of the carrier, and an auxiliary ball member disposed away from the first axis, and the carrier includes a first auxiliary guide groove partially accommodating the auxiliary ball member, the housing includes a second auxiliary guide groove partially accommodating the auxiliary ball member, and a length of the second auxiliary guide groove is at least twice the length of the first auxiliary guide groove.

In another general aspect, a camera module includes a ball group disposed on an inside surface of a housing, a carrier disposed on the ball group, and a reflective member disposed on the carrier changing a direction of light to a direction of an optical axis, wherein the carrier rotates about a first axis, wherein the first axis goes through a main ball member of the ball group, and wherein an auxiliary ball member of the ball group moves along an auxiliary guide groove.

The auxiliary guide groove may extend in a circumferential direction of the first axis.

The auxiliary guide groove may include a first auxiliary guide groove disposed in the carrier and a second auxiliary guide groove disposed in the inside surface of the housing, and the auxiliary ball member may be accommodated in the first auxiliary guide groove and the second auxiliary guide groove.

The auxiliary ball member may contact the auxiliary guide groove at one point.

The camera module may further include magnetic members exerting a pulling force between the carrier and the inside surface of the housing, the auxiliary ball member may include two or more auxiliary ball members, and a center of the pulling force may be inside a region surrounded by the ball group.

The magnetic members may include a magnet disposed in the carrier, and the magnet may have a donut shape in a cross-section transverse to the first axis direction, and one or both of a notch and an extension in the donut shape to center the pulling force inside the region surrounded by the ball group.

The camera module may further include a rotation holder disposed on the carrier to rotate about a second axis perpendicular to the first axis, the reflective member is disposed on the rotation holder, and an outer periphery of the rotation holder may include a cylindrical surface having a center of curvature farther from the cylindrical surface than the first axis.

The rotation holder may contact an upper post of the carrier at an end of rotation about the second axis.

In another general aspect, a camera module includes a ball group disposed on an inside surface of a housing, a carrier disposed on the ball group, a reflective member disposed on the carrier changing a direction of light to a direction of an optical axis, and magnetic members exerting a pulling force between the carrier and the inside surface of the housing, wherein the carrier rotates about a first axis substantially parallel to the pulling force, wherein the magnetic members include a magnet having a donut shape in a cross-section transverse to the first axis direction, and wherein an auxiliary ball member of the ball group moves along an auxiliary guide groove.

The magnet may include one or both of a notch and an extension in the donut shape to position the pulling force within a predetermined region of the carrier.

The first axis of the carrier may include a main ball member of the ball group disposed at a center of the first axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
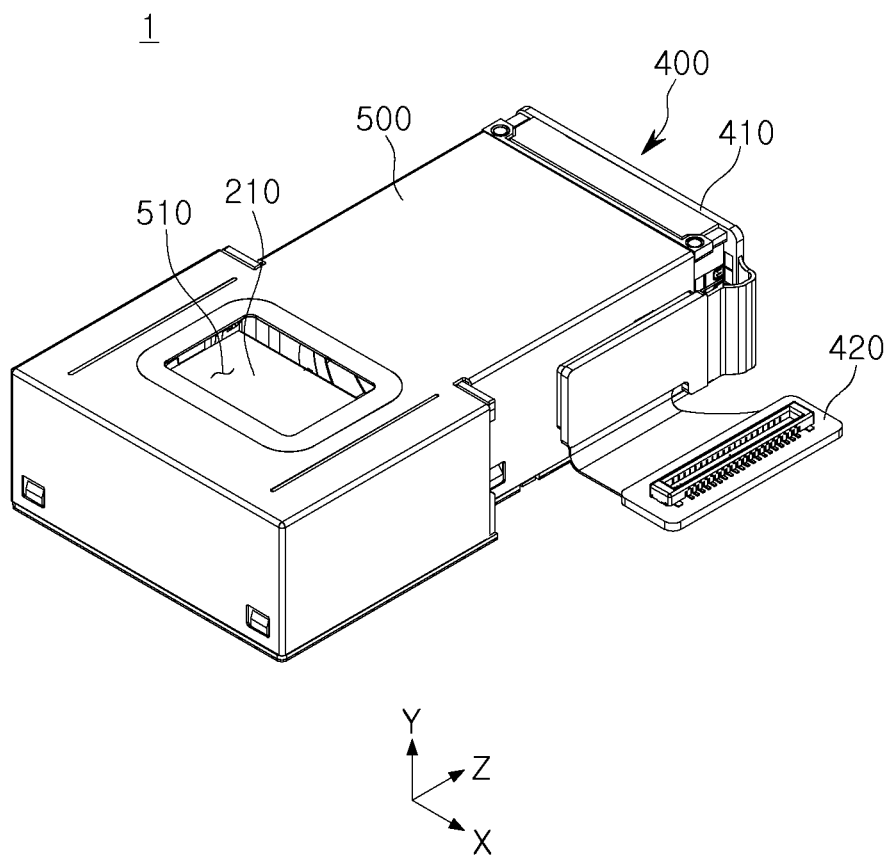
FIG. 1 is a perspective view of a camera module according to one or more example embodiments.

Hereinafter, while example embodiments of the present disclosure are described in detail with reference to the accompanying illustrative drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a folded module that may easily stabilize an image not only when taking a picture of a still subject, but also when capturing a video of a moving subject, and a camera module including the same.

Another aspect of the present disclosure may provide a folded module that may track a moving subject and stabilize an image thereof, and a camera module including the same.

Figure 2:
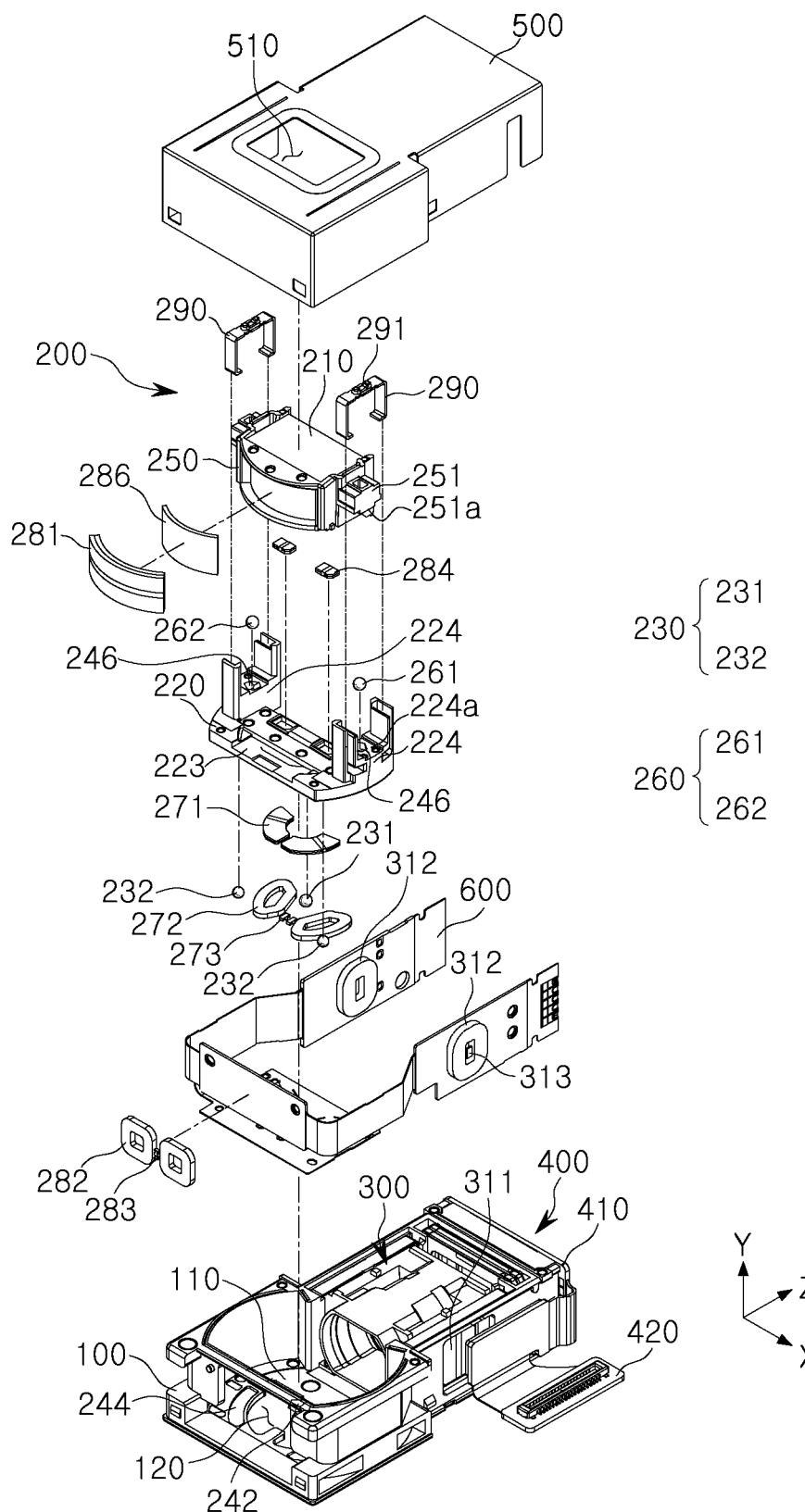
FIG. 2 is an exploded perspective view of the camera module according to one or more example embodiments.
Figure 3:
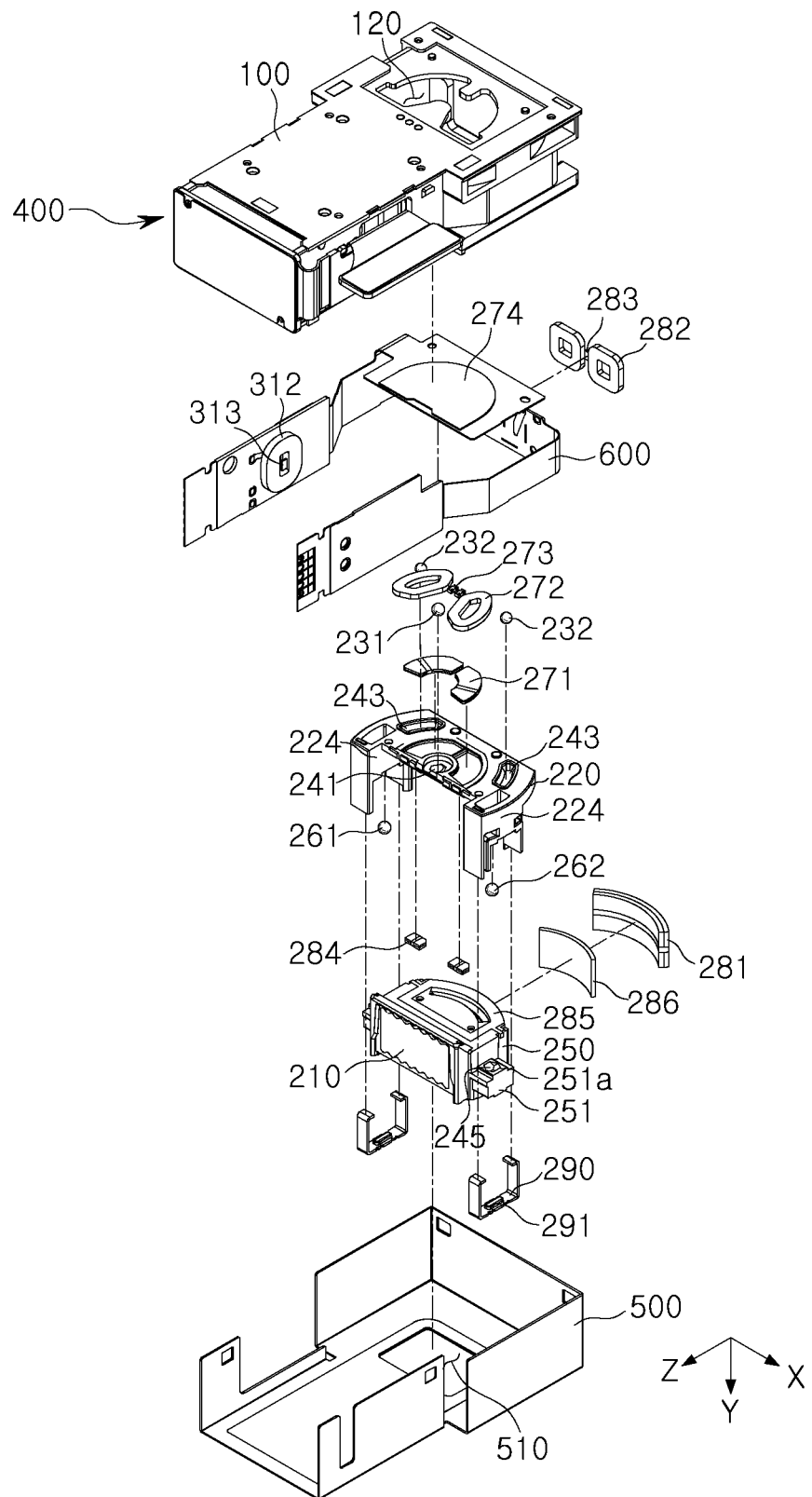
FIG. 3 is an exploded perspective view of the camera module of FIG. 2 viewed in a direction different from a direction of FIG. 2.
Figure 4:
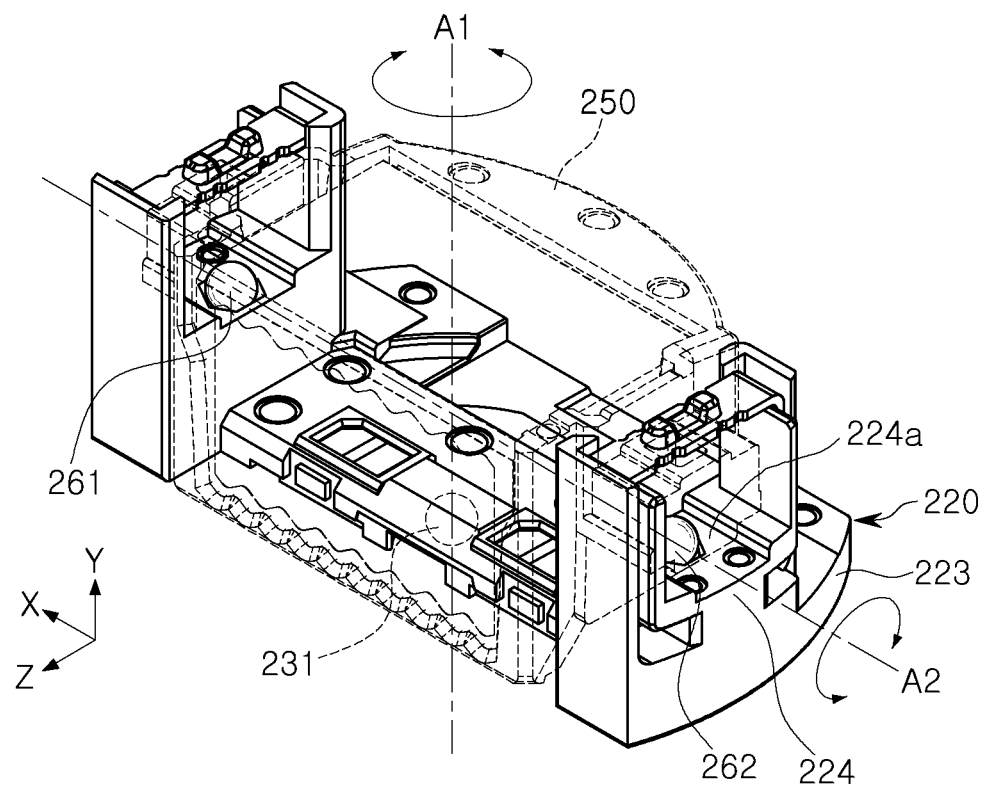
FIG. 4 is a view illustrating that an optical image stabilization (OIS) function of a folded module may be driven in an example embodiment.

FIG. 1 is a perspective view of a camera module 1 according to one or more example embodiments; FIG. 2 is an exploded perspective view of the camera module 1 according to one or more example embodiments; FIG. 3 is an exploded perspective view of the camera module 1 of FIG. 2 viewed in a direction different from a direction of FIG. 2; and FIG. 4 is a view illustrating that an optical image stabilization (01S) function of a folded module may be driven in an example embodiment.

In an example embodiment, the camera module 1 may include a housing 100 and optical elements disposed in the housing 100. The optical elements may include a folded module 200 and a lens module 300. The housing 100 may protect and support the optical elements accommodated therein. In an example embodiment, the camera module 1 may include an image sensor module 400. The image sensor module 400 may include a sensor substrate 410 and an image sensor disposed on the sensor substrate 410, and light passing through the lens module 300 may finally reach an imaging plane of the image sensor. Although not shown in the drawings, the image sensor may be disposed for the imaging plane to face the lens module. An image formed on the imaging plane may be converted into an electrical signal by elements included in the image sensor, and this electrical signal may be transmitted outward from the camera module 1 through a connector 420.

In an example embodiment, the camera module 1 may include a cover 500 partially enclosing the housing 100. The cover 500 may prevent optical elements accommodated in the housing 100 from being separated outwardly from the housing 100. For example, the housing 100 may have a shape of a box having an open top portion, the cover 500 may cover the top portion of the housing 100, and the optical elements may be disposed in a space surrounded by the housing 100 and the cover 500.

In addition, the cover 500 may include a material capable of shielding an electromagnetic wave. In this case, the cover 500 may prevent or minimize the electromagnetic wave occurring in the camera module from escaping outward from the camera module 1 or the electromagnetic wave occurring outside the camera module 1 from entering the camera module 1. For example, when the camera module 1 includes a voice coil motor (VCM) for performing the optical image stabilization (01S) function or an autofocus (AF) function, the cover 500 may prevent the electromagnetic wave occurring from the voice coil motor from affecting an electronic component positioned outside the camera module 1. In addition, the cover 500 may prevent or minimize the electromagnetic wave occurring in the electronic component positioned outside the camera module 1 from affecting an operation of the voice coil motor (e.g., electromagnetic interaction generated between a coil and a magnet). The cover 500 may be made of a metal material such as phosphor bronze, stainless steel, or brass to shield the camera module 1 from the electromagnetic wave.

In an example embodiment, the folded module 200 may reflect light entering through an opening 510 of the cover 500 to the lens module 300. For example, the folded module 200 may include a reflective member 210. For example, the reflective member 210 may include a prism or a mirror.

The light reflected through the folded module 200 may be refracted while passing through the lens module 300, and may finally reach the image sensor module 400. The lens module 300 may include a barrel and at least one lens accommodated in the barrel.

In an example embodiment, the camera module 1 may perform the AF function. In an example embodiment, the lens module 300 may be moved with respect to the housing 100 along an optical axis, and a distance between the lens module 300 and the image sensor may thus be changed. That is, a focus of the lens may be adjusted as the lens module 300 is moved in an optical axis direction. The camera module 1 may include an AF driver which may move the lens module 300 in the optical axis direction. The AF driver may include an AF magnet 311 positioned in the lens module 300, and an AF coil 312 positioned in the housing 100. When a current flows through the AF coil 312, the lens module 300 may perform a reciprocating motion in the optical axis direction (i.e., parallel to a Z-axis direction) by an electromagnetic interaction generated between the AF magnet 311 and the AF coil 312. The AF driver may include an AF position sensor 313 measuring a position of the lens module 300 in the optical axis direction. The AF position sensor 313 may be fixedly positioned in the housing 100, may detect a change in the intensity or direction of a magnetic field formed by the AF magnet 311 positioned in the lens module 300 as the lens module 300 is moved with respect to the housing 100 in the optical axis direction, and may measure which position the lens module 300 is positioned with respect to the housing 100 in the optical axis direction based on this change. The AF position sensor 313 may be disposed inside or outside the AF coil 312. The AF position sensor 313 may be a magnetic sensor such as a Hall sensor, a magnetoresistance sensor, etc.

When the camera is shaken unintentionally (due to a user's hand-shake for example), an image formed on the image sensor may be unstable in a direction perpendicular to the optical axis direction. In this case, the camera module 1, according to an example embodiment, may implement a function for correcting this unstable image (i.e., optical image stabilization, hereinafter 'OIS'). In an example embodiment, the camera module 1 may implement the OIS function by driving the folded module 200.

In an example embodiment, the OIS function may be implemented by rotating the folded module 200 about an axis perpendicular to the optical axis. For example, when the camera module 1 is shaken, the folded module 200 may be tilted with respect to the axis perpendicular to the optical axis in a predetermined range to optically stabilize the unstable image. Here, the folded module 200 may have one or more tilt axes. For example, when the optical axis is parallel to a Z axis, the folded module 200 may be rotated about a yaw axis parallel to a Y axis and a pitch axis parallel to an X axis. For example, when viewed from the folded module 200 toward the lens module 300, a term "yawing" or "yaw" may indicate a movement of the folded module 200 to be tilted left and right, and a term "pitching" or "pitch" may indicate the movement of the folded module 200 to be tilted up and down.

In the present disclosure, when the folded module 200 is rotated (or pivoted or tilted) about the Y axis, this rotation may be referred to as the "yawing" of the folded module 200, and vice versa. In addition, when the folded module 200 is rotated (or pivoted or tilted) about the X axis, this rotation may be referred to as the "pitch" of the folded module 200, and vice versa.

Referring to FIGS. 2 through 4, the folded module 200 may include a carrier 220 and a rotation holder 250 accommodated in the carrier 220. The carrier 220 may carry the reflective member 210. For example, the carrier 220 may rotate the reflective member 210 about a first axis A1 perpendicular to the optical axis. The carrier 220 may be supported by a first ball group 230 interposed between a bottom surface 110 of the housing 100 and the carrier 220 to be rotated about the first axis A1 parallel to the Y axis, and the rotation holder 250 may be supported by a second ball group 260 interposed between the carrier 220 and the rotation holder 250 to be rotated about a second axis A2 parallel to the X axis. In the present disclosure, the first axis A1 and the second axis A2 may refer to the yaw axis and the pitch axis, respectively.

Figure 5:
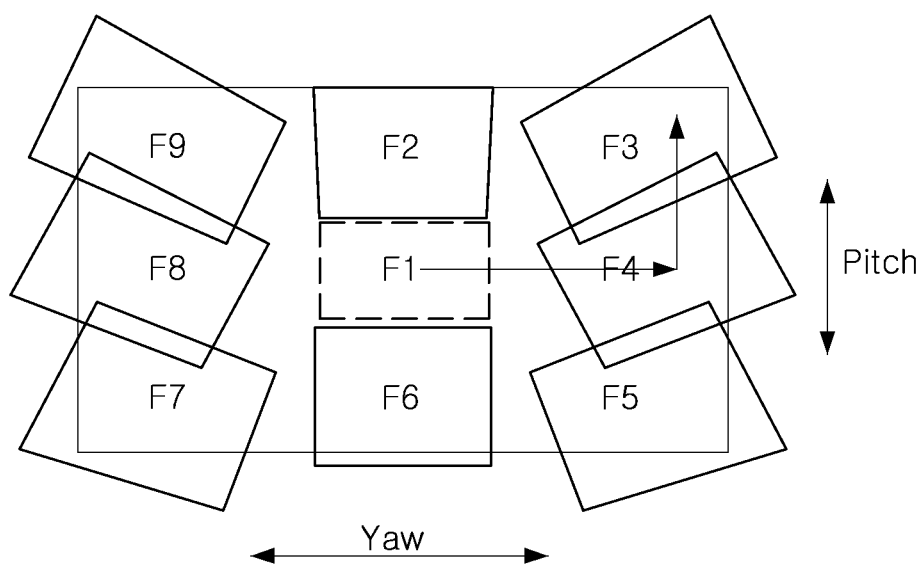
FIG. 5 is a view illustrating an imaging range of a camera module according to an example embodiment.

FIG. 5 is a view illustrating an imaging range of the camera module 1 according to an example embodiment.

A first region F1 may indicate an imaging region of the camera module 1 when the folded module 200 (or reflective member 210) is in a neutral state. The imaging region of camera module 1 may be moved as the reflective member 210 is yawed or pitched. For example, a fourth region F4 or an eighth region F8 may be captured when the reflective member 210 is rotated about the yaw axis while the first region F1 is captured. For another example, a second region F2 may be captured when the reflective member 210 is rotated about the pitch axis in one direction. A third region F3 or a ninth region F9 may be captured when the reflective member 210 is rotated about the yaw axis while the second region F2 is captured. As yet another example, a sixth region F6 may be captured when the reflective member 210 is rotated about the pitch axis in the other direction. A fifth region F5 or a seventh region F7 may be captured when the reflective member 210 is rotated about the yaw axis while the sixth region F6 is captured.

The camera module 1 may capture a subject in a relatively wide region using all images obtained from the first region F1 to the eighth region F8. In addition, the camera module 1 may capture a subject while tracking the moving subject by rotating the reflective member 210. Here, a captured image may be distorted except when the reflective member 210 is in the neutral state. The distorted image may be corrected (e.g., cropped, rectified or the like) using software.

In an example embodiment, the reflective member 210 may be rotated about the first axis A1 with respect to the housing 100. In an example embodiment, the folded module 200 may be assembled to the housing 100 to be rotated about the first axis A1. In an example embodiment, the folded module 200 may include the carrier 220 rotated about the first axis A1 with respect to the housing 100, and the reflective member 210 may be positioned on the carrier 220 and may be rotated together with the carrier 220.

In an example embodiment, the carrier 220 may be disposed on the bottom surface 110 of the housing 100. The first ball group 230 may be disposed between the housing 100 and the carrier 220. The first ball group 230 may maintain a constant distance between the carrier 220 and the bottom surface 110 of the housing 100 while supporting the carrier 220.

In an example embodiment, the first ball group 230 may include a main ball member 231 (or first ball member) and an auxiliary ball member 232 (or second ball member). The main ball member 231 may provide a rotation axis (i.e., first axis A1) of the carrier 220. The auxiliary ball member 232 may support the carrier 220 to prevent the rotation axis of the carrier 220 from being tilted.

Referring to FIGS. 2 and 3, the main ball member 231 may be partially accommodated in main guide grooves 241 and 242, respectively positioned in the carrier 220 and the housing 100. The main guide grooves 241 and 242 may include the first main guide groove 241 positioned in a lower surface 221 of the carrier 220 and the second main guide groove 242 positioned in the bottom surface 110 of the housing 100.

In an example embodiment, the main ball member 231 may perform only a rotational motion rather than a translational motion by being supported at three points in the first main guide groove 241 and the second main guide groove 242, respectively. Accordingly, the main ball member 231 may maintain a fixed position with respect to the housing 100 and the carrier 220 while the carrier 220 is rotated about the first axis A1. That is, the main ball member 231 may provide the yaw axis (i.e., first axis A1) of the carrier 220. Accordingly, the main ball member 231 may be supported by the three points with respect to the housing 100 and the carrier 220, thereby preventing the yaw axis from being moved.

In an example embodiment, the first main guide groove 241 and the second main guide groove 242 may include three or more inclined surfaces, respectively, and the main ball member 231 may be in contact with one inclined surface at one point. For example, the main guide grooves 241 and 242 may each have a shape of a truncated triangular pyramid.

In an example embodiment, the auxiliary ball member 232 may be partially accommodated in auxiliary guide grooves 243 and 244, positioned in the carrier 220 and the housing 100, respectively. The auxiliary guide grooves 243 and 244 may include the first auxiliary guide groove 243 positioned in the lower surface 221 of the carrier 220, and the second auxiliary guide groove 244 positioned in the bottom surface 110 of the housing 100. The auxiliary ball member 232 may be moved along the auxiliary guide grooves 243 and 244 as the carrier 220 is rotated about the first axis A1.

Figure 6:
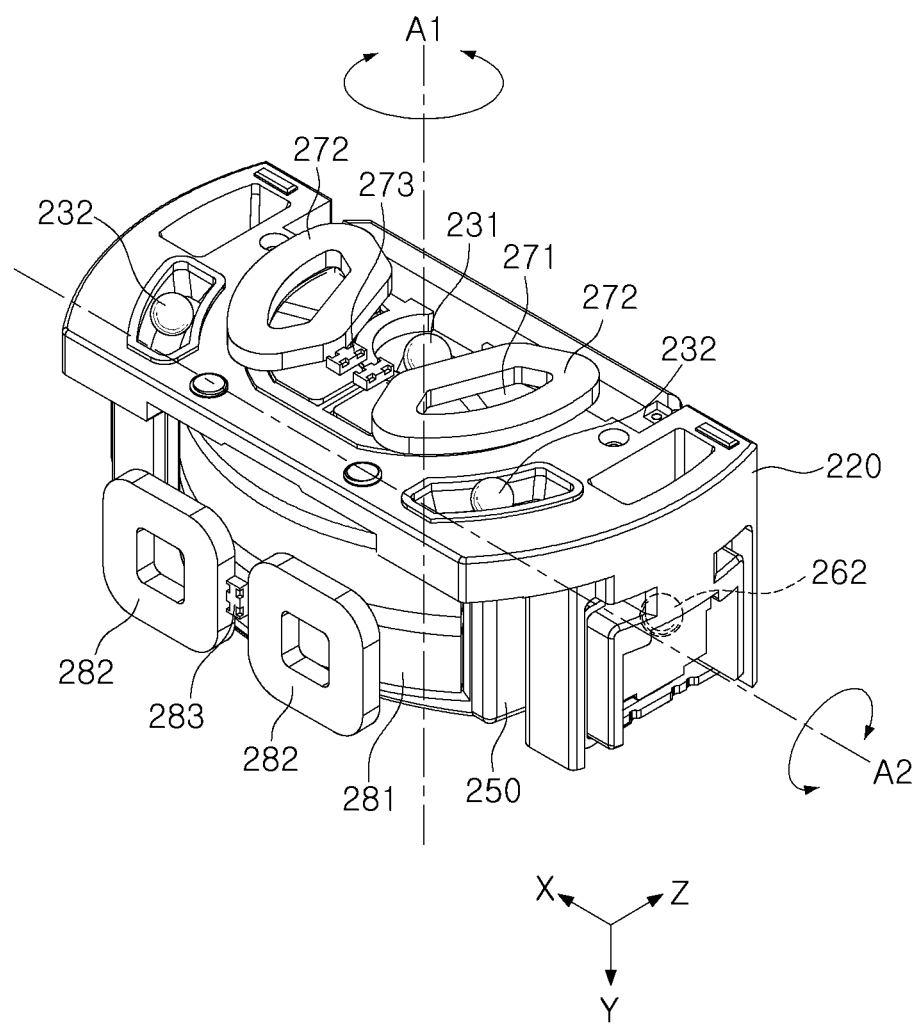
FIG. 6 is a view illustrating an OIS driver of the folded module according to an example embodiment.
Figure 7:
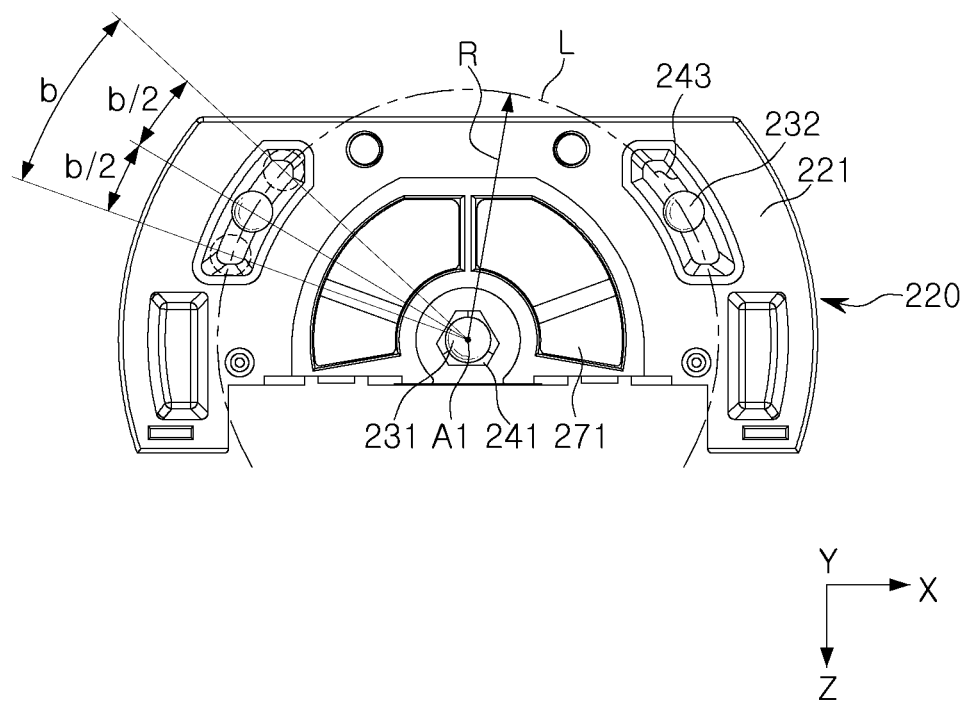
FIG. 7 is a view illustrating a lower surface of a first-type carrier according to an example embodiment.

FIG. 6 is a view illustrating an OIS driver of the folded module according to an example embodiment; FIG. 7 is a view illustrating a lower surface 221 of a first-type carrier according to an example embodiment; and FIG. 8 is a view illustrating the bottom surface of the housing supporting the carrier according to an example embodiment.

Figure 8:
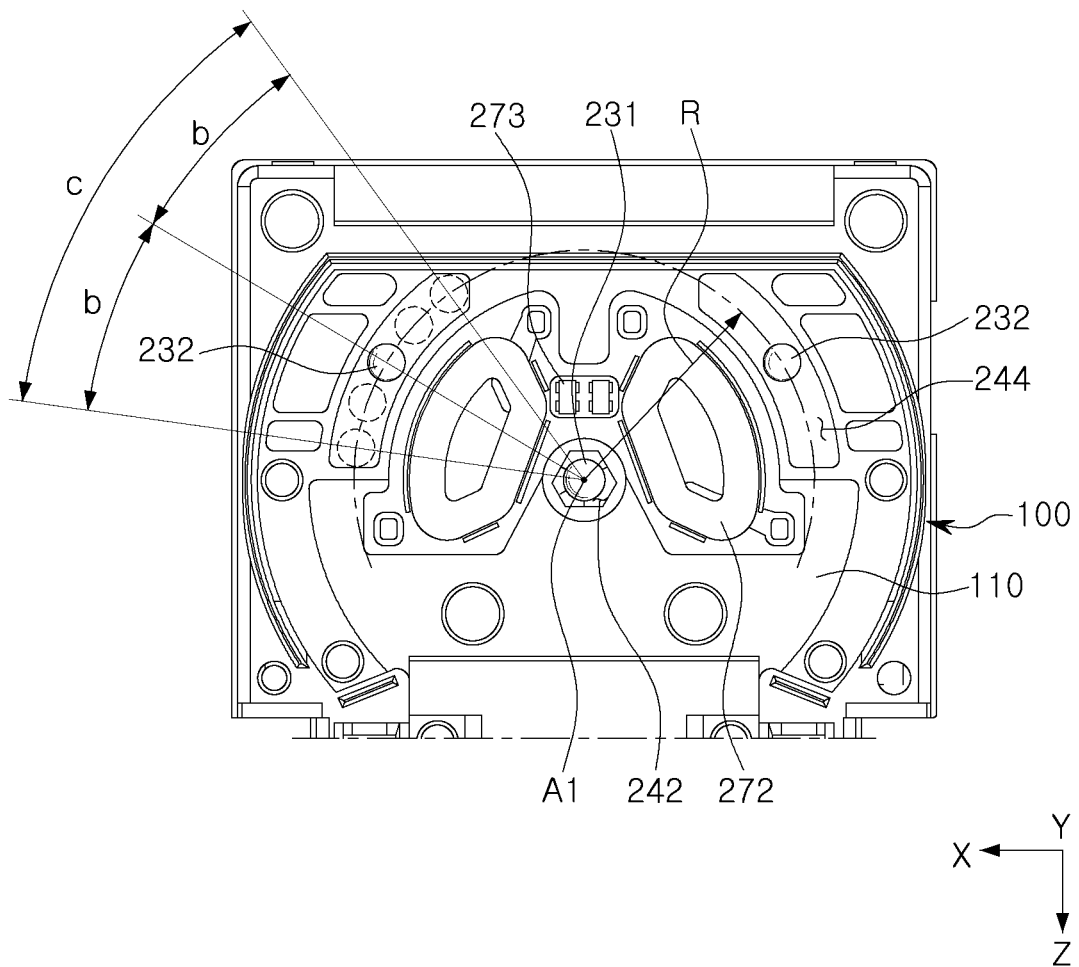
FIG. 8 is a view illustrating a bottom surface of a housing supporting the carrier according to an example embodiment.

Referring to FIGS. 7 and 8, the auxiliary guide grooves 243 and 244 in an example embodiment may be extended in a curved line. In an example embodiment, the auxiliary guide grooves 243 and 244 may be extended in a circumferential direction of the first axis A1. In an example embodiment, the auxiliary guide grooves 243 and 244 may be extended in a shape of an arc around the first axis A1. For example, a center line L of the auxiliary guide grooves 243 and 244 in a longitudinal direction may have the shape of an arc having a radius R about the first axis A1. That is, curvature centers of the auxiliary guide grooves 243 and 244 may be positioned on the first axis A1.

When each of the auxiliary guide grooves 243 and 244 has the shape of a curved line, the carrier 220 may be yawed more stably. If the guide groove has a shape of a straight line, the auxiliary ball member 232 may collide with the guide groove or may easily slip at a contact point between the auxiliary ball member 232 and the guide groove, when performing a rolling motion along the guide groove. For example, when the straight guide groove has a V-shaped cross-section, the auxiliary ball member 232 may be supported at two points at which the auxiliary ball member 232 is in contact with the guide groove. Here, when the auxiliary ball member 232 is about to be moved along an arc trajectory based on the first axis, the auxiliary ball member 232 may slip at the contact point between the auxiliary ball member 232 and the guide groove. As another example, when the straight guide groove has a cross-section of a 'U'-shaped plane, there may be only one contact point between the auxiliary ball member 232 and the guide groove. In this case, when the auxiliary ball member 232 is about to be moved along the arc trajectory based on the first axis, the auxiliary ball member 232 may hardly slip at the contact point. However, there is no structure to limit the auxiliary ball member 232 to be moved constantly, the auxiliary ball member 232 may thus collide with a side wall of the guide groove while performing the rolling motion, and the image obtained by the cameral module may thus become unstable. That is, when the guide groove has the shape of a straight line, an increased driving force may be required for driving the yawing of the carrier 220 or a quality of the image obtained by the camera module may be deteriorated, due to the collision between the ball member and the guide groove.

Figure 9:
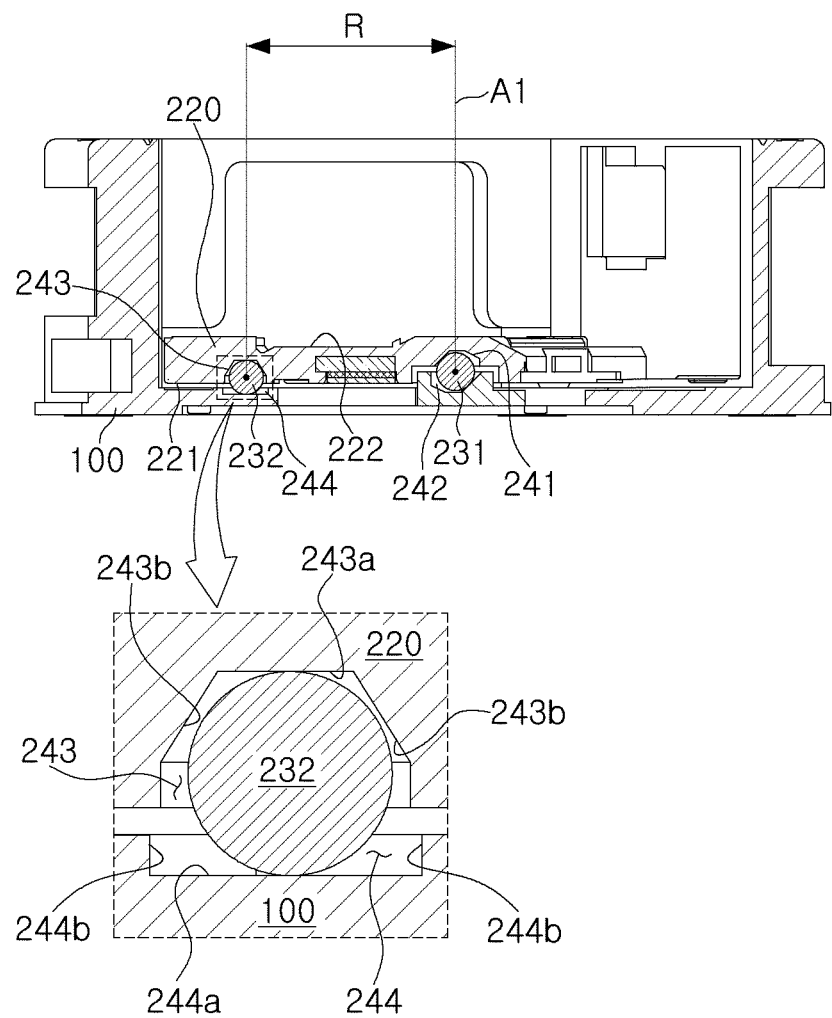
FIG. 9 is a view illustrating a support structure between the first-type carrier and the housing in an example embodiment.

FIG. 9 is a view illustrating a support structure between the first-type carrier 220 and the housing 100 in an example embodiment. FIG. 9 is a cross-sectional view in which the housing 100 and the carrier 220 are cut in a plane parallel to the first axis by passing through the centers of the auxiliary ball member 232 and the main ball member 231.

Referring to FIG. 9, the auxiliary ball member 232 and the main ball member 231 may have diameters different from each other. In an example embodiment, the auxiliary ball member 232 may have a smaller diameter than the main ball member 231.

The auxiliary ball member 232 may have the smaller size, and the folded module 200 may thus have improved design freedom. For example, a top surface 222 of a portion of the carrier 220, supported by the auxiliary ball member 232, may be positioned closer to the bottom surface 110 as the auxiliary ball member 232 has the smaller size. As the top surface 222 is lowered, a pitch range of the rotation holder 250 described below may be increased, thereby widening the image stabilization range or imaging range of the camera module.

In an example embodiment, the auxiliary guide grooves 243 and 244 may limit a movement direction of the auxiliary ball member 232 for the auxiliary ball member 232 to only be moved in the direction perpendicular to a direction of the first axis A1. The rotation axis of the carrier 220 (i.e., first axis A1) may be provided by the main ball member 231 and the main guide grooves 241 and 242, and the auxiliary guide grooves 243 and 244 and the auxiliary ball member 232 may support the carrier 220 to prevent the rotation axis of the carrier 220 from being tilted.

In an example embodiment, the auxiliary ball member 232 may be supported at one point in the auxiliary guide groove 243 or 244. That is, the auxiliary ball member 232 may be in contact with the first auxiliary guide groove 243 at one point, and may be in contact with the second auxiliary guide groove 244 at one point. For example, when there is an imaginary straight line passing through a center of the auxiliary ball member 232 and parallel to the Y axis, this straight line may meet a surface of the auxiliary ball member 232 at two points, and these two points may be in contact with the first auxiliary guide groove 243 and the second auxiliary guide groove 244, respectively. In this case, a distance between the points where the auxiliary ball member 232 comes into contact with the first auxiliary guide groove 243 and the second auxiliary guide groove 244 may correspond to the diameter of the auxiliary ball member 232.

In an example embodiment, the auxiliary guide grooves 243 and 244 may be positioned for the auxiliary ball member 232 to be moved in the auxiliary guide grooves 243 and 244 in a radial direction of the first axis A1.

Referring to FIG. 9, the first auxiliary guide groove 243 may include a bottom surface 243a and an inclined surface (or wall surface) 243b extended to each side thereof from the bottom surface 243a. The inclined surface 243b may only loosely limit a movement path of the auxiliary ball member 232, and may allow the auxiliary ball member 232 to be moved in the first auxiliary guide groove 243 in the radial direction of the first axis A1 to a certain extent.

The second auxiliary guide groove 244 may include a bottom surface 244a and a wall surface 244b extended to each side thereof from the bottom surface 244a. The wall surface 244b may only loosely limit the movement path of the auxiliary ball member 232, and may allow the auxiliary ball member 232 to be moved in the second auxiliary guide groove 244 in the radial direction of the first axis A1 to a certain extent.

In an example embodiment, the first auxiliary guide groove 243 may be positioned for the auxiliary ball member 232 to be spaced apart from the inclined surface 243b or to be in contact with the inclined surface 243b at one point. For example, when accommodated in the first auxiliary guide groove 243, the auxiliary ball member 232 may be spaced apart from the inclined surfaces 243b on each side of the first auxiliary guide groove 243 or may be in contact with the inclined surface 243b only at one point. That is, the auxiliary ball member 232 may only support the carrier 220 at a contact point between the auxiliary ball member 232 and the bottom surface 243a, and does not support the carrier 220 at a contact point between the auxiliary ball member 232 and the inclined surface 243b.

In an example embodiment, the inclined surface 243b of the auxiliary guide groove 243 may not come into contact with the auxiliary ball member 232 when the auxiliary ball member 232 is in its ideal position (i.e., center of the auxiliary guide groove 243). As the carrier 220 is rotated about the first axis A1, the auxiliary ball member 232 may also perform the rolling motion along a circular trajectory based on the first axis A1. The position of the auxiliary ball member 232 may be deviated from its ideal position due to an external force or a friction imbalance. Here, the inclined surface 243b may limit a deviation range of the auxiliary ball member 232, thereby assisting the auxiliary ball member 232 to stably support the carrier to be rotated about the first axis A1. The angle and shape of the inclined surface 243b may be configured to minimize friction occurring when the inclined surface 243b comes into contact with the auxiliary ball member 232.

Figure 10:
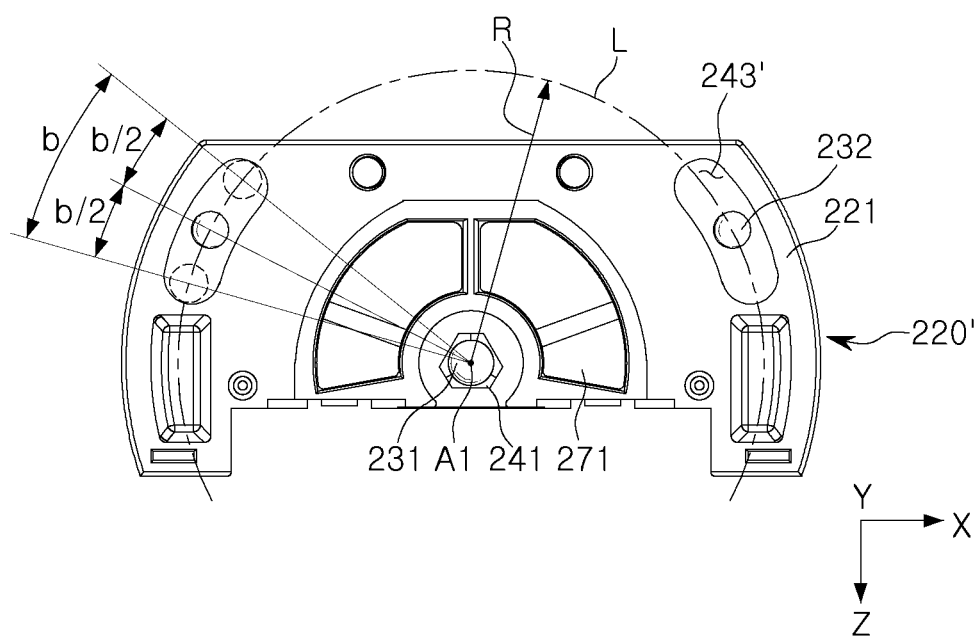
FIG. 10 is a view illustrating a lower surface of a second-type carrier in an example embodiment.
Figure 11:
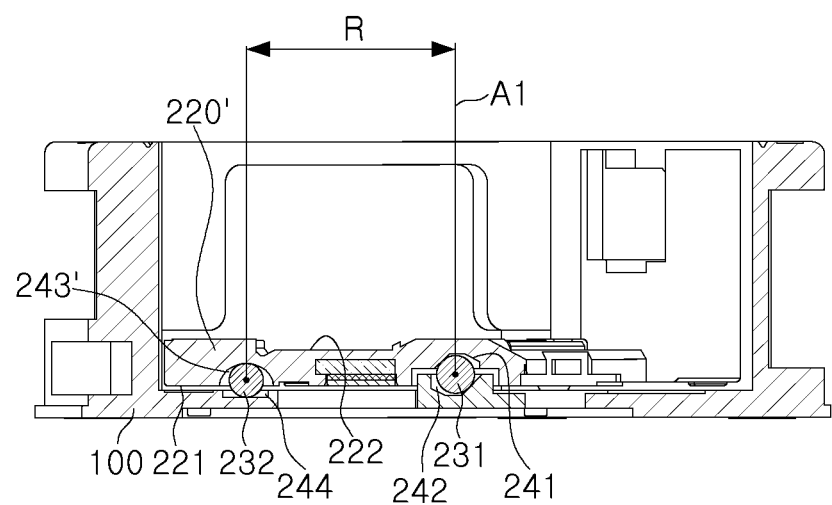
FIG. 11 is a view illustrating a support structure between the second-type carrier and the housing in an example embodiment.

FIG. 10 is a view illustrating a lower surface 221 of a second-type carrier 220' in an example embodiment; and FIG. 11 is a view illustrating a support structure between the second-type carrier 220' and the housing 100 in an example embodiment. FIG. 11 is a cross-sectional view in which the housing 100 and the carrier 220' are cut in a plane parallel to the first axis A1 by passing through the centers of the auxiliary ball member 232 and the main ball member 231.

Referring to FIGS. 10 and 11, a first auxiliary guide groove 243' may have an arc-shaped cross-section. For example, the first auxiliary guide groove 243' may have the same shape as that of an inner circumferential surface of a pipe. Here, the auxiliary ball member 232 may be in contact with the first auxiliary guide groove 243' at one point. For example, a cross-section of the first auxiliary guide groove 243' may have a first radius, and the auxiliary ball member 232 may have a smaller radius than the first radius. The auxiliary ball member 232 may come into contact with the deepest portion of the first auxiliary guide groove 243'. The arc-shaped first auxiliary guide groove 243' may guide the auxiliary ball member 232 to be positioned at a center of the auxiliary guide groove 243'.

Figure 12:
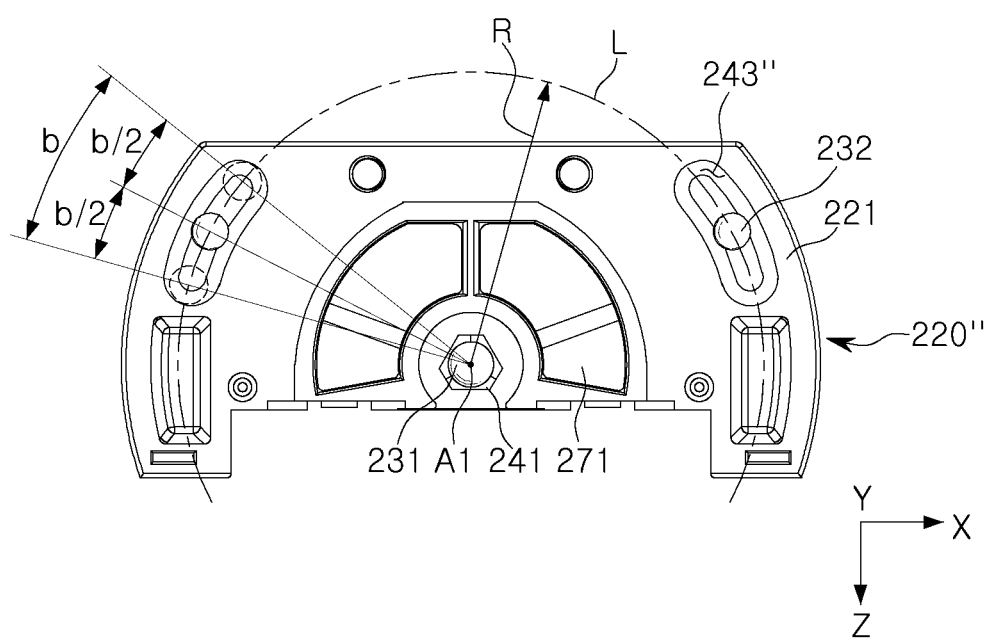
FIG. 12 is a view illustrating a lower surface of a third-type carrier in an example embodiment.
Figure 13:
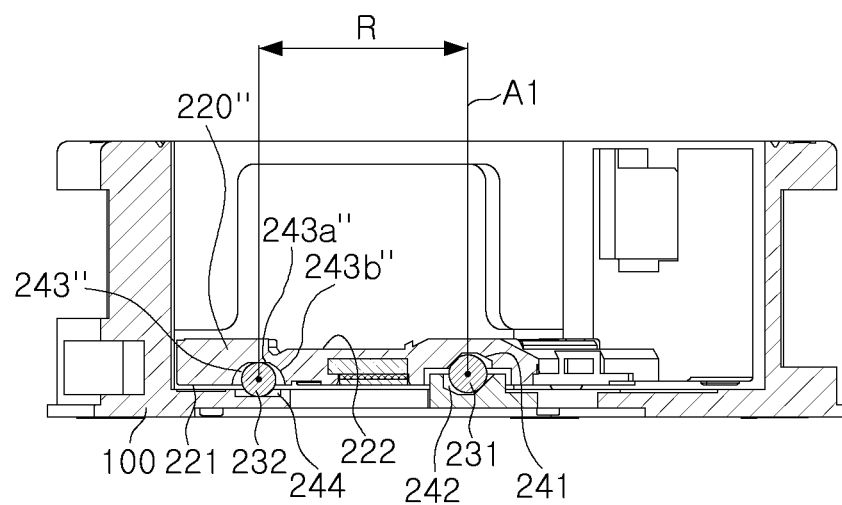
FIG. 13 is a view illustrating a support structure between the third-type carrier and the housing in an example embodiment.

FIG. 12 is a view illustrating a lower surface 221 of a third-type carrier 220" in an example embodiment; and FIG. 13 is a view illustrating a support structure between the third-type carrier 220" and the housing 100 in an example embodiment.

Referring to FIGS. 12 and 13, a first auxiliary guide groove 243" may include a flat bottom surface 243a" and a curved surface 243b" in the shape of an arc extended to each side of the flat bottom surface 243a". That is, it may be understood that this curved surface 243b" replaces the inclined surface 243b of the first auxiliary guide groove 243 in the first-type carrier 220.

In the present disclosure, the first-type carrier 220, the second-type carrier 220' and the third-type carrier 220" may only be distinguished from one another by the different cross-sections of the first auxiliary guide grooves 243, 243' and 243", positioned on the lower surface 221, and have the rest of the structures equal to one another. Although the first-type carrier 220 is referred to as the "carrier" for convenience of explanation, such a component referred to as the carrier in the present disclosure may include both of the other two types of the carriers 220' and 220". That is, the component denoted by reference number 220 in the present disclosure may be any of the second-type carrier 220' and the third-type carrier 220", shown in FIGS. 10 through 13. Similarly, the component denoted by reference number 243 may not only be the first auxiliary guide groove 243 in the first-type carrier 220, but also may be the first auxiliary guide groove 243' in the second-type carrier 220', or the first auxiliary guide groove 243" in the third-type carrier 220".

The first auxiliary guide groove 243 may include two or more guide grooves. In this case, the guide grooves may not be required to have all the same cross-sectional shapes, and may have different cross-sectional shapes. For example, the auxiliary guide groove positioned on one side may have the circular cross-section shown in FIG. 11, and the auxiliary guide groove positioned on the other side may have the inclined surface as shown in FIG. 9.

Referring to FIGS. 7 and 8, the second auxiliary guide groove 244 may be longer than the first auxiliary guide groove 243.

While the carrier 220 is yawed, the auxiliary ball member 232 may perform the rolling motion against the auxiliary guide grooves 243 and 244 on both sides thereof. It may be assumed that the auxiliary ball member 232 is positioned at a longitudinal end of the second auxiliary guide groove 244 when the carrier 220 is rotated about the first axis A1. In this case, when the carrier 220 is further rotated clockwise, the auxiliary ball member 232 may slip between the auxiliary guide grooves 243 and 244, which may increase the friction between the auxiliary ball member 232 and the auxiliary guide grooves 243 and 244. This increased friction may result in loss of driving force and may affect performance of the OIS function.

In an example embodiment, when the second auxiliary guide groove 244 is longer than the first auxiliary guide groove 243, it is possible to minimize interference between the auxiliary ball member 232 and the auxiliary guide grooves 243 and 244 caused by the yawing of the carrier 220. In an example embodiment, a length of the second auxiliary guide groove 244 may be at least twice the length of the first auxiliary guide groove 243. It may be sufficient that the second auxiliary guide groove 244 is positioned for the auxiliary ball member 232 not to be deviated from the second auxiliary guide groove 244, and an upper limit of its length may depend on the shape of the carrier 220.

In the present disclosure, the auxiliary guide grooves 243 and 244 have the curved shape, which is only an example. In another example embodiment, the auxiliary guide grooves 243 and 244 may have a straight shape. Even in this case, the length of the second auxiliary guide groove 244 may also be at least twice the length of the first auxiliary guide groove 243.

For example, "c" may be 2b or more where "b" indicates a length of the trajectory along which the center of the auxiliary ball member 232 is moved in a case where the auxiliary ball member 232 is moved along the first auxiliary guide groove 243, and where "c" indicates a length of the trajectory along which the center of the auxiliary ball member 232 is moved in a case where the auxiliary ball member 232 is moved along the second auxiliary guide groove 244.

In the present disclosure, the neutral state may indicate a state in which the centers of the first auxiliary guide groove 243 and the second auxiliary guide groove 244 coincide with each other, and where the auxiliary ball member 232 is positioned in the centers of the auxiliary guide grooves 243 and 244. The auxiliary ball member 232 in the neutral state may be moved by b/2 clockwise or counterclockwise along the first auxiliary guide groove 243. In an example embodiment, the second auxiliary guide groove 244 may allow the auxiliary ball member 232 to be moved by "b" in any of the two directions (i.e., clockwise, or counterclockwise direction) from the center of the second auxiliary guide groove 244.

Figure 14:
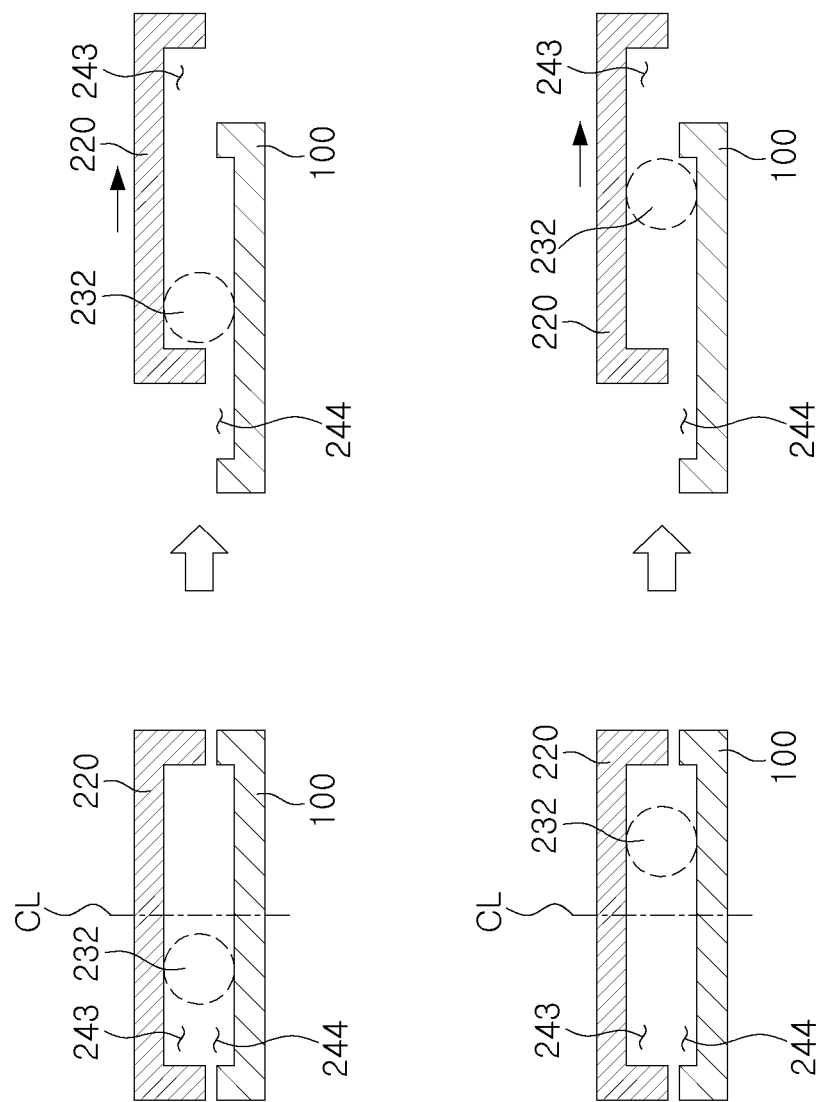
FIG. 14 is a view illustrating interference occurring between a ball member and a guide groove when the guide grooves formed in both sides of the ball member have lengths equal to each other.
Figure 15:
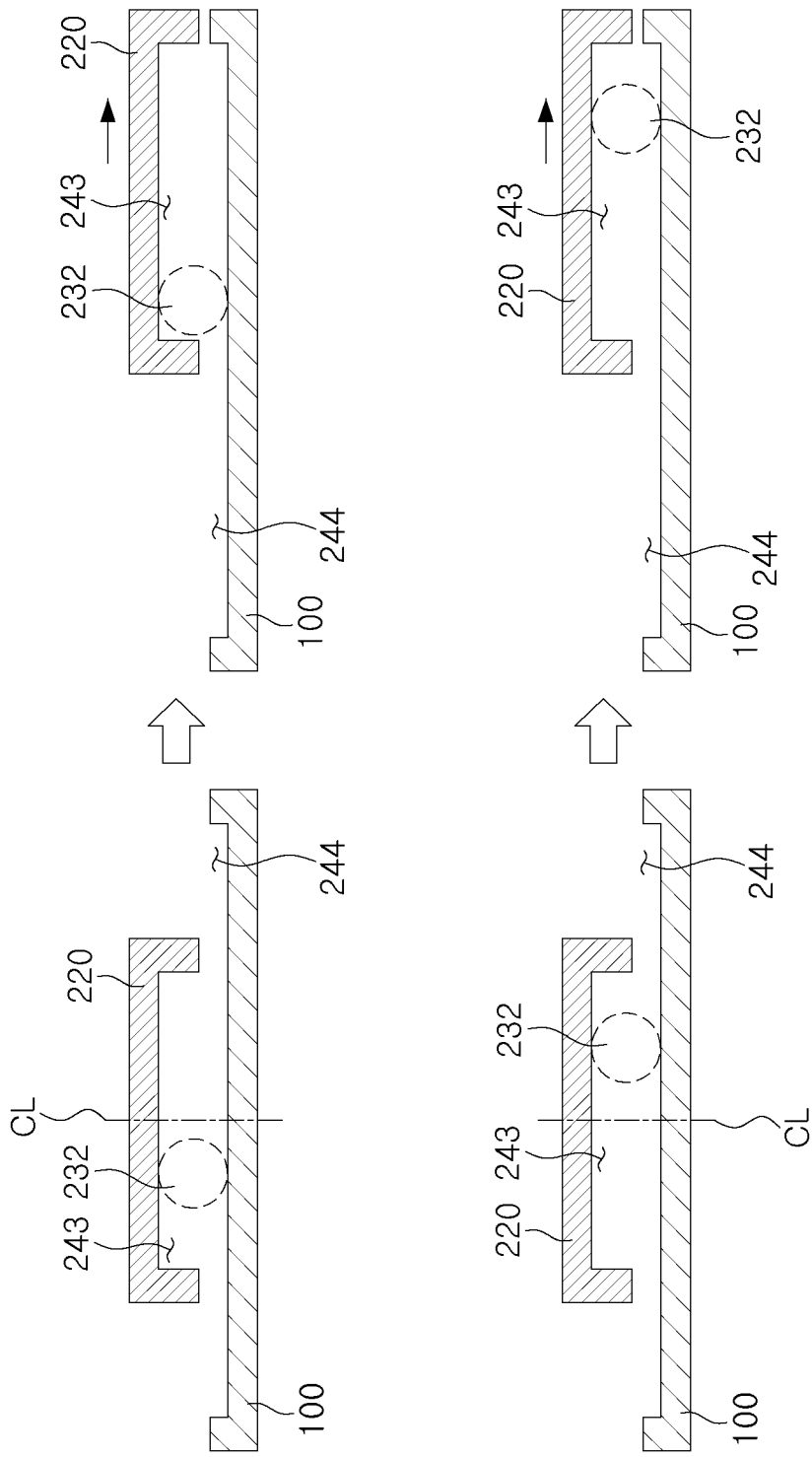
FIG. 15 is a view illustrating interference occurring between the ball member and the guide groove when the guide grooves formed on both sides of the ball member have lengths different from each other in an example embodiment.

FIG. 14 is a view illustrating interference occurring between a ball member and a guide groove when the guide grooves formed in both sides of the ball member have lengths equal to each other; and FIG. 15 is a view illustrating interference occurring between the ball member and the guide groove when the guide grooves formed on both sides of the ball member have lengths different from each other in an example embodiment.

It may be ideal that in the neutral state, the auxiliary ball member 232 is positioned on the center lines CL of the first auxiliary guide groove 243 and the second auxiliary guide groove 244, and the auxiliary ball member 232 may perform the rolling motion without being in contact with the ends of the auxiliary guide grooves 243 and 244 while the carrier 220 is rotated with respect to the housing 100 to the limit in one direction. However, when positioned off center, the auxiliary ball member 232 may be in contact with the end of the first auxiliary guide groove 243 or that of the second auxiliary guide groove 244 when the carrier 220 is rotated with respect to the housing 100 to the limit in one direction.

Referring to FIG. 14, when positioned to be spaced apart from the center line CL to the left, the auxiliary ball member 232 may come into contact with the left end of the first auxiliary guide groove 243 before the carrier 220 is moved to the right limit. For another example, when positioned to be spaced apart from the center line CL to the right, the auxiliary ball member 232 may come into contact with the right end of the second auxiliary guide groove 244 before the carrier 220 is moved to the right limit.

In the case where the second auxiliary guide groove 244 is longer than the first auxiliary guide groove 243, even when the auxiliary ball member 232 in the neutral state is not positioned on the center lines CL of the auxiliary guide grooves 243 and 244, the auxiliary ball member 232 may have no section in which the auxiliary ball member 232 is in contact with the ends of the auxiliary guide grooves 243 and 244, or may have a section in which the auxiliary ball member 232 slips to a minimum extent even if the auxiliary ball member 232 comes into contact with the ends of the auxiliary guide grooves 243 and 244, while the carrier 220 is rotated with respect to the housing 100 to the limit in one direction.

For example, referring to FIG. 15, when positioned to be spaced apart from the center line CL to the left, the auxiliary ball member 232 may come into contact with the left end of the first auxiliary guide groove 243 before the carrier 220 is moved to the right limit. However, the auxiliary ball member 232 may be subsequently moved without being in contact with the auxiliary guide groove. The reason is that the auxiliary ball member 232 may be in its ideal position or close to the ideal position as being repeatedly driven. In addition, when positioned to be spaced apart from the center line CL to the right, the auxiliary ball member 232 may continuously perform the rolling motion without being in contact with the end of the second auxiliary guide groove 244 while the carrier 220 is moved to the right limit.

Referring to FIGS. 2 through 4, the camera module 1 in an example embodiment may include a first OIS driver (yaw driver) that rotates the folded module 200 about the first axis A1. The first OIS driver may include a first OIS magnet 271 positioned in the carrier 220 and a first OIS coil 272 positioned in the housing 100. The first OIS coil 272 may be positioned on a substrate 600 surrounding an exterior of the housing 100, and the housing 100 may include an opening 120 through which the first OIS coil 272 is exposed toward the first OIS magnet 271.

In an example embodiment, the first OIS magnet 271 and the first OIS coil 272 may be disposed to face each other. The folded module 200 or the carrier 220 may be rotated about the first axis A1 by an electromagnetic interaction between the first OIS magnet 271 and the first OIS coil 272.

The first OIS driver may include a first OIS position sensor 273. The first OIS position sensor 273 may be fixedly positioned in the housing 100 together with the first OIS coil 272, may detect a change in the intensity or direction of a magnetic field formed by the first OIS magnet 271 positioned in the carrier 220 as the carrier 220 is rotated about the first axis A1 with respect to the housing 100, and may measure how much the carrier 220 is rotated about the first axis A1 with respect to the housing 100 based on this change. The first OIS position sensor 273 may be disposed inside or outside the first OIS coil 272. The first OIS position sensor 273 may be the magnetic sensor such as a Hall sensor, a magnetoresistance sensor, etc.

Figure 16A:
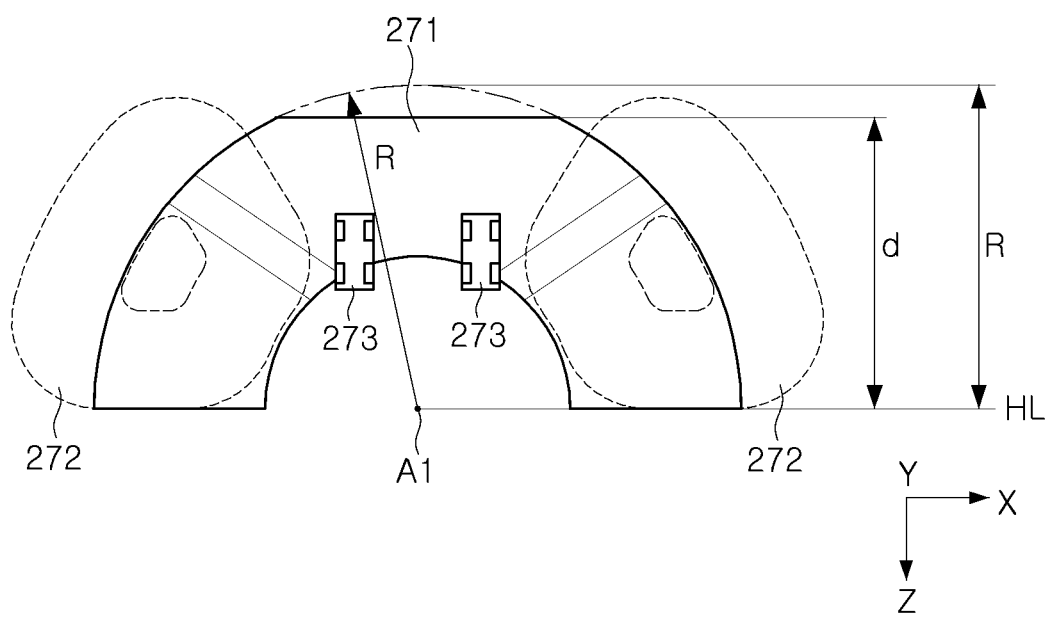
FIG. 16A shows a yaw driver of a reflective member in an example embodiment.
Figure 16B:
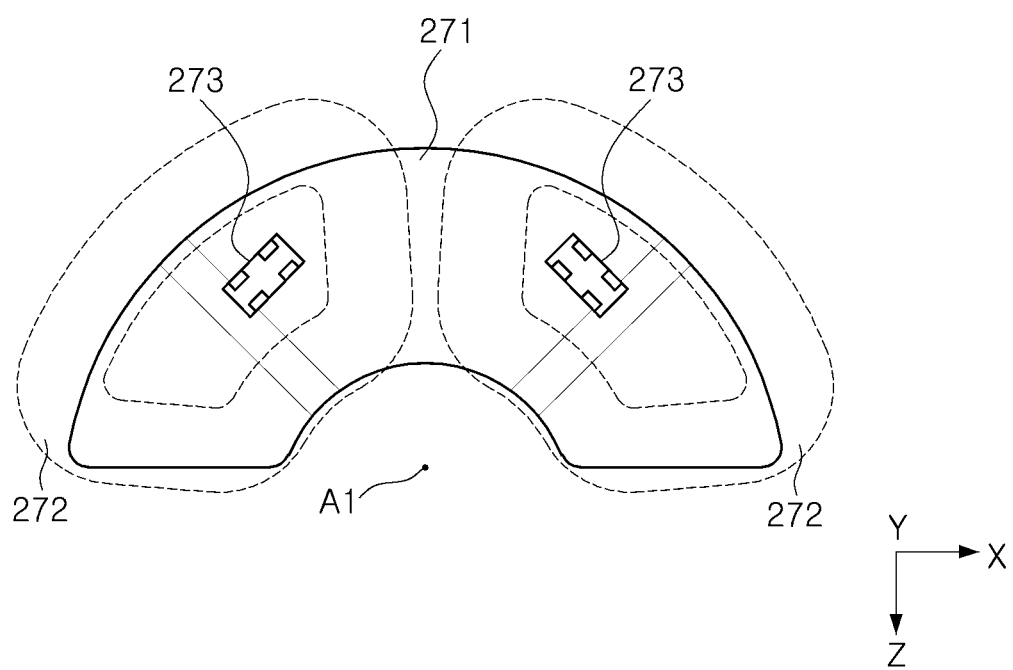
FIG. 16B shows a yaw driver of a reflective member in another example embodiment.

FIG. 16A shows a yaw driver of a reflective member in an example embodiment; FIG. 16B shows a yaw driver of a reflective member in another example embodiment; and FIG. 16C shows a yaw driver of a reflective member in yet another example embodiment.

Figure 16C:
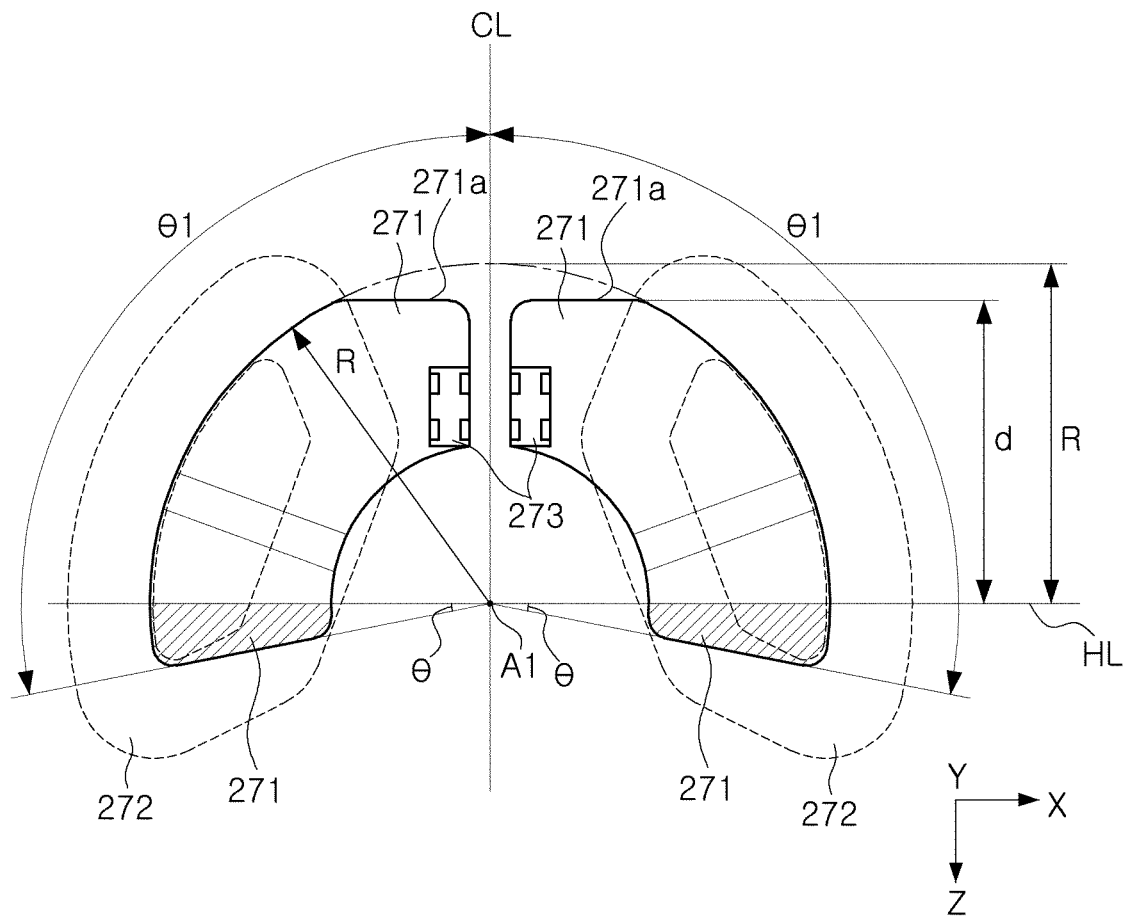
FIG. 16C shows a yaw driver of a reflective member in yet another example embodiment.

Referring to FIGS. 16A through 16C, the first OIS magnet 271 in an example embodiment may be extended in a curved shape. For example, the first OIS magnet 271 may have a shape of a donut centered on the first axis A1.

Referring to FIGS. 16A and 16C, when the first OIS magnet 271 in another example embodiment has the donut shape, a portion of its outer arc may be cut. For example, an outer edge of the first OIS magnet 271 may have the shape of an arc having a radius R from the first axis A1, and its portion farther than "d" smaller than the radius R based on a horizontal line HL passing through the first axis A1 may be removed from the first OIS magnet 271.

Referring to FIGS. 16A through 16C, the first OIS magnet 271 in yet another example embodiment may have an arc shape. For example, the first OIS coil 272 may have an incised donut shape, and a straight portion connecting the inner and outer arc portions thereof may be extended centered on the first axis in a substantially radial direction.

The first OIS position sensor 273 may be disposed inside or outside the first OIS coil 272. Referring to FIGS. 16A and 16C, the first OIS position sensor 273 in an example embodiment or in yet another example embodiment may be disposed outside the first OIS coil 272. When the first OIS position sensor 273 is the magnetic sensor and disposed outside the first OIS coil 272, it is possible to minimize the effect of the magnetic field on the first OIS position sensor 273, occurring by the OIS coil. This disposition may contribute to accurately measuring an angle at which the folded module 200 is yawed.

Figure 17:
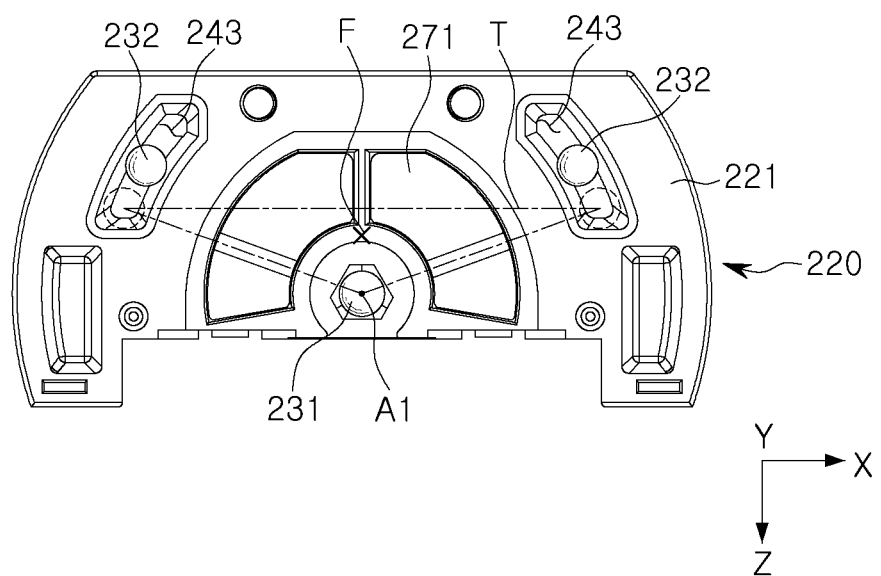
FIG. 17 is a view illustrating a relationship between a pulling force and supporting ball members in an example embodiment.

FIG. 17 is a view illustrating a relationship between a pulling force and supporting ball members in an example embodiment.

In an example embodiment, the camera module 1 may include a first pulling member pulling the carrier 220 to the bottom surface 110 of the housing 100. In an example embodiment, the first pulling member may include a first magnetic member positioned in the carrier 220 and a second magnetic member positioned in the housing 100. For example, the first magnetic member may be the first OIS magnet 271, and the second magnetic member may be a first pulling yoke 274. Referring to FIG. 3, the first pulling yoke 274 may be attached to the substrate 600, and disposed opposite to the first OIS coil 272.

In an example embodiment, the carrier 220 may be pulled to the bottom surface 110 of the housing 100 by a magnetic attraction (hereinafter, the pulling force) generated between the first OIS magnet 271 and the first pulling yoke 274. Accordingly, the first ball group 230 may maintain close contact with the housing 100 and the carrier 220, and a movement of the carrier 220 may be limited to a rotational motion about the first axis A1.

The three ball members 231 and 232 included in the first ball group 230 may support the carrier 220 when the pulling force pulls the folded module 200 to the bottom surface 110 of the housing 100. If a center of the pulling force F is positioned outside a triangular region T surrounded by the three ball members 231 and 232, the carrier 220 may be moved in a direction other than its rotational direction centered on the first axis A1. For example, the contact between the ball member 231 or 232 included in the first ball group 230 and the carrier 220 (or housing 100) may be released, and the carrier 220 may thus be moved in an unexpected direction.

In an example embodiment, the first pulling member may be positioned for the center of the pulling force F to be positioned in the region T formed by the first ball group 230. In an example embodiment, the first OIS magnet 271 or first pulling yoke 274 may be positioned for the pulling force to pass through the inside of the region connecting the main ball member 231 and the auxiliary ball members 232 to one another. For example, the pulling force may have an action line of a resultant force, passing through the inside of the triangular region T connecting the three ball members 231 and 232 to one another.

The auxiliary ball members 232 may have different positions as the carrier 220 is yawed, and accordingly, the triangle support region T may also have a shape changed as the carrier 220 is yawed. The auxiliary ball member 232 may be moved between longitudinal ends of the first auxiliary guide groove 243, and the support region T may have the smallest area when the auxiliary ball members 232 are positioned at the ends farthest from each other. For example, the support region T may have the smallest area when the auxiliary ball members 232 are positioned at the ends closest to a side of the carrier 220 closest to the main ball member 231. In an example embodiment, the first pulling member may also be positioned for the center of the pulling force F to be positioned in the region T as the carrier 220 is yawed.

Referring to FIG. 16C together with FIG. 17, the first OIS magnet 271 in an example embodiment may have a shape of a cut donut. For example, the first OIS magnet 271 may have the shape of a donut centered on the first axis A1 (or main ball member 231).

In an example embodiment, the first OIS magnet 271 may have the shape of a donut. Here, the first OIS magnet 271 may be positioned where its cross-section center is positioned in the support region T. For example, the first OIS magnet 271 may have a half-donut shape to which a portion is added or from which a portion is removed for the center of the pulling force F to be positioned in the support region T.

In an example embodiment, the first OIS magnet 271 may have a shape of a donut extended in the circumferential direction of the first axis A1, having a notch where a portion of an outer edge 271a is parallel to the horizontal line HL perpendicular to the optical axis (i.e., Z axis) and intersecting the first axis A1.

In an example embodiment, the first OIS magnet 271 may have the shape of a donut from which a portion of the outer edge is cut (i.e., a notch). For example, the outer edge of the first OIS magnet 271 may have the shape of an arc having the radius R from the first axis A1, and its portion farther than "d" smaller than the radius R based on the horizontal line HL passing through the first axis A1 may be removed from the first OIS magnet 271. When the portion of the first OIS magnet 271, far from the support region, is removed, the center of the pulling force F may be moved toward the main ball member 231, and the center of the pulling force F may be positioned in the support region T.

In an example embodiment, both ends of the first OIS magnet 271 may be further extended in a +Z direction with respect to the main ball member 231, which may move the center of the pulling force F toward the main ball member 231. For example, the first OIS magnet 271 may be extended in the circumferential direction at an angle of more than 180 degrees from one end to the other end with respect to the first axis A1. For example, the first OIS magnet 271 may further include a portion further extended downward with respect to the main ball member 231. For example, both of the ends of the first OIS magnet 271 may be further extended downward by a predetermined angle θ based on the horizontal line HL passing through the first axis A1 (e.g., shaded portion in FIG. 16C).

In an example embodiment, the first OIS magnet 271 may have a shape of a donut intersecting the first axis A1 and extended at an angle (θ1) of 90 degrees or more in the circumferential direction of the first axis A1 with respect to the center line CL parallel to the optical axis (i.e., Z axis). Here, the first OIS magnet 271 may have a symmetrical shape with respect to the center line CL.

In an example embodiment, the first auxiliary guide groove 243 may have a shape allowing the center of the pulling force F to be positioned in the support region T. That is, the first auxiliary guide groove 243 may have the shape allowing the center of the pulling force F to be positioned in the support region T even when the auxiliary ball member 232 is positioned at the lowest point of the first auxiliary guide groove 243.

In an example embodiment, the folded module 200 may include the rotation holder 250 disposed in the carrier 220. The reflective member 210 may be positioned in the rotation holder 250 and may be moved with respect to the carrier 220 together with the rotation holder 250.

In an example embodiment, the rotation holder 250 may be rotated about the second axis A2 with respect to the carrier 220.

Referring to FIG. 2 through FIG. 4, the carrier 220 in an example embodiment may include a sidewall 224 extended upward from each side of a base 223. The second ball group 260 may be disposed on an end 224a of the sidewall 224, and a portion of the rotation holder 250 may be seated on the second ball group 260. The rotation holder 250 may include a protrusion 251 extended on each side thereof, and a lower side 251a of the protrusion 251 may include a first guide groove 245 accommodating the second ball group 260. A second guide groove 246 accommodating the second ball group 260 may be positioned on the end 224a of the sidewall 224. The second ball group 260 may support the rotation holder 250 to be rotated about the pitch axis (i.e., second axis A2) with respect to the carrier 220. For example, the second ball group 260 may include second ball members 261 and 262 disposed on either side of the carrier 220 from each other on the second axis A2.

Referring to FIGS. 2 through 4, the folded module 200 in an example embodiment may include a second OIS driver that rotates the rotation holder 250 about the second axis A2. The second OIS driver may include a second OIS magnet 281 positioned in the rotation holder 250 and a second OIS coil 282 positioned in the housing 100. In an example embodiment, the rotation holder 250 may be rotated about the second axis A2 with respect to the carrier 220 by an electromagnetic interaction generated between the second OIS magnet 281 and the second OIS coil 282.

The second OIS driver may include a second OIS position sensor 283. The second OIS position sensor 283 may be fixedly positioned in the housing 100 together with the second OIS coil 282, may detect a change in the intensity or direction of a magnetic field formed by the second OIS magnet 281 positioned in the rotation holder 250 as the rotation holder 250 is rotated about the second axis A2 with respect to the carrier 220, and may measure how many the rotation holder 250 is rotated about the second axis A2 with respect to the carrier 220 based on this change The second OIS position sensor 283 may be disposed inside or outside the second OIS coil 282. The second OIS position sensor 283 may be the magnetic sensor such as a Hall sensor, a magnetoresistance sensor, etc.

In an example embodiment, the folded module 200 may include a second pulling member pulling the rotation holder 250 to the lower surface 221 of the carrier 220. The second pulling member may include a magnetic member positioned in the rotation holder 250 and another magnetic member positioned in the lower surface 221 of the carrier 220. The magnetic attraction generated between the magnetic members may function as the pulling force. For example, the magnetic attraction generated between a pulling magnet 284 positioned on the top surface 222 of the carrier 220 and a second pulling yoke 285 positioned on the rotation holder 250 may pull the rotation holder 250 to the carrier 220.

In an example embodiment, the contact between the second ball group 260 and the guide grooves 245 and 246 may be maintained while the rotation holder 250 is pitched with respect to the carrier 220 by the pulling force generated by the pulling magnet 284 and the second pulling yoke 285. Accordingly, the movement of the rotation holder 250 with respect to the carrier 220 may be limited to the rotational motion about the second axis A2.

In an example embodiment, the second OIS driver may further include a back yoke 286 disposed between the second OIS magnet 281 and the rotation holder 250. The back yoke 286 may allow a magnetic flux of the second OIS magnet 281 to be concentrated toward the second OIS coil 282, thereby increasing driving force of the second OIS driver.

In an example embodiment, the back yoke 286 may be formed integrally with the second pulling yoke 285. For example, the second pulling yoke 285 may include a portion extended to face one surface of the second OIS magnet 281, and this portion may function as the back yoke 286 for the second OIS magnet 281.

In an example embodiment, the folded module 200 may include a stopper 290 preventing the rotation holder 250 from being disengaged from the carrier 220. The stopper 290 may be inserted into the carrier 220 after the protrusion 251 of the rotation holder 250 is seated on the end 224a of the sidewall 224. In an example embodiment, the stopper 290 may include a buffer member 291, and the buffer member

291 may alleviate impact or noise even when the rotation holder 250 collides with the stopper 290 due to an external impact. The buffer member 291 may be made of, for example, urethane, rubber, silicone, etc.

Figure 18:
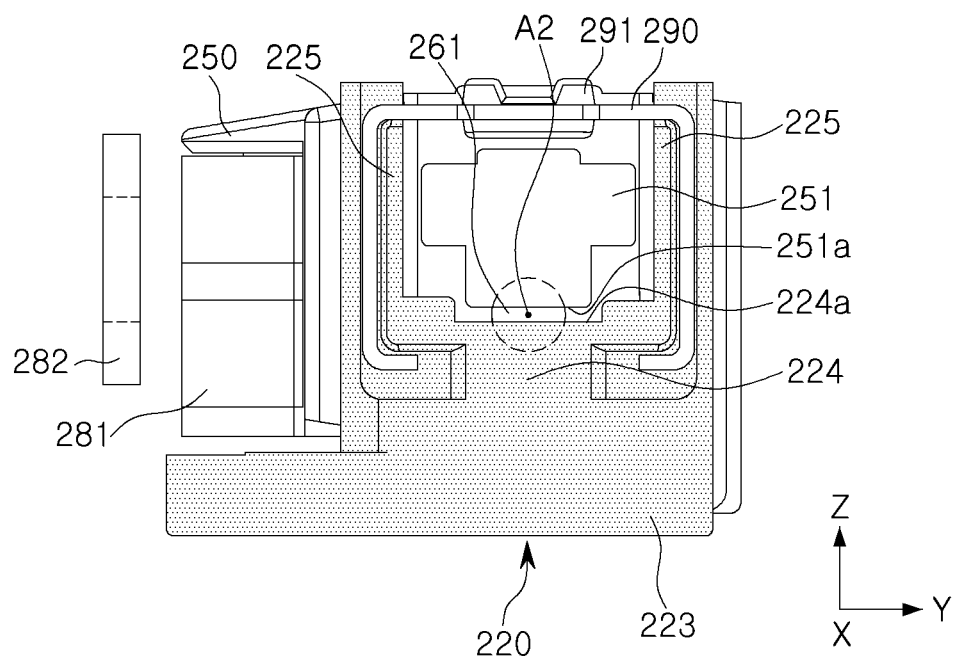
FIG. 18 is a side view of a rotation holder accommodated in the carrier in an example embodiment.
Figure 19:
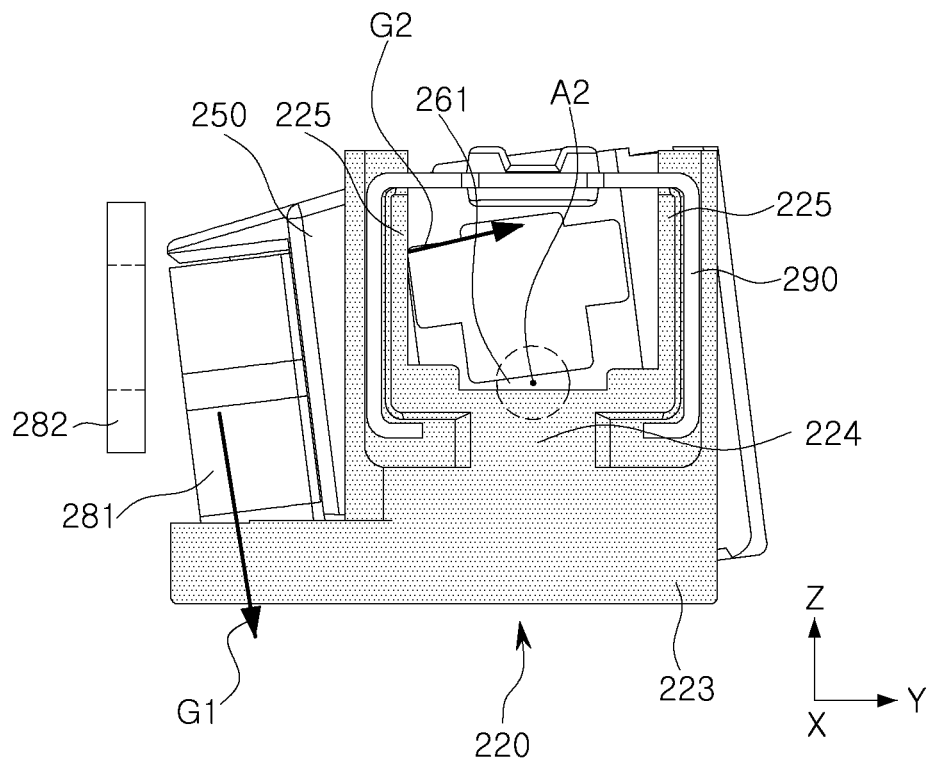
FIG. 19 a view illustrating that the rotation holder is rotated to a limit of its pitch range in an example embodiment.

FIG. 18 is a side view of a rotation holder 250 accommodated in the carrier in an example embodiment; and FIG. 19 a view illustrating that the rotation holder 250 is rotated to a limit of its pitch range in an example embodiment.

Referring to FIG. 18, the carrier 220 in an example embodiment may include a post 225 extended from the end of the sidewall. The post 225 may be positioned on each side of the protrusion 251 of the rotation holder 250. Accordingly, the protrusion 251 may be surrounded by the upper end 224a of the sidewall 224, the post 225 and the stopper 290.

The protrusion 251 and a structure (i.e., end 224a of the sidewall 224, post 225 and stopper 290) surrounding the protrusion 251 may limit the pitch range of the rotation holder 250. For example, as the rotation holder 250 is rotated about the second axis A2 with respect to the carrier 220, a portion of the protrusion 251 may hit the post 225 or the upper end 224a of the sidewall 224, which may limit a rotation range of the rotation holder 250.

When the rotation holder 250 collides with the carrier 220 during its pitch driving, an unexpected movement may occur in the rotation holder 250 due to the impact. For example, the contact between the second ball group 260 and the guide grooves 245 and 246 may be released by the impact, and accordingly, the rotation holder 250 may be moved in a direction other than a direction of its rotation with respect to the second axis A2.

In an example embodiment, when the rotation holder 250 comes into contact with the carrier 220, a reaction force G2 acting on the rotation holder 250 may have a direction approximately perpendicular to a direction of driving force G1 of the second OIS driver, or may have an angle of approximately 180 degrees. In this case, even though the rotation holder 250 collides with the carrier 220, the contact between the second ball group 260 and the guide grooves 245 and 246 may be maintained.

Referring to FIG. 19, when the driving force G1 acts downward, the reaction force G2 may be generated in the rotation holder 250 in the circumferential direction of the second axis A2 at a moment when the protrusion 251 collides with the post 225. Here, the directions of the driving force G1 and the reaction force G2 may have an angle of approximately 90 degrees, the contact between the second ball group 260 and the guide grooves 245 and 246 may be maintained.

Figure 20A:
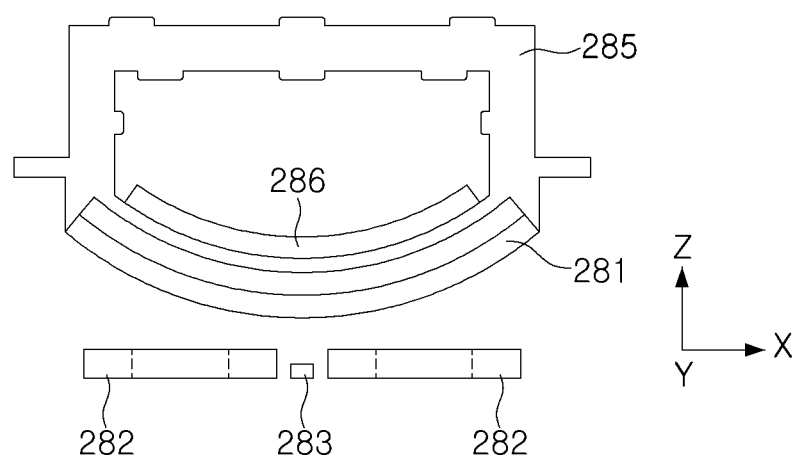
FIG. 20A shows a first-type pitch driver according to an example embodiment.
Figure 20B:
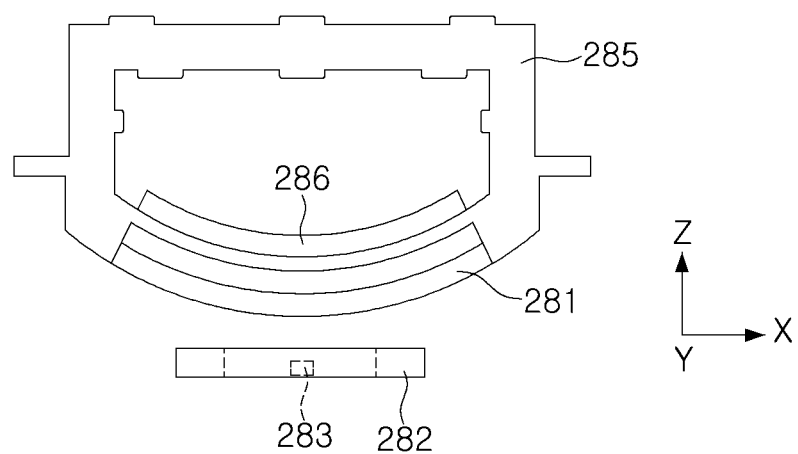
FIG. 20B shows a second-type pitch driver according to an example embodiment.

FIG. 20A shows a first-type pitch driver according to an example embodiment; FIG. 20B shows a second-type pitch driver according to an example embodiment; and FIG. 20C shows a third-type pitch driver according to an example embodiment.

Figure 20C:
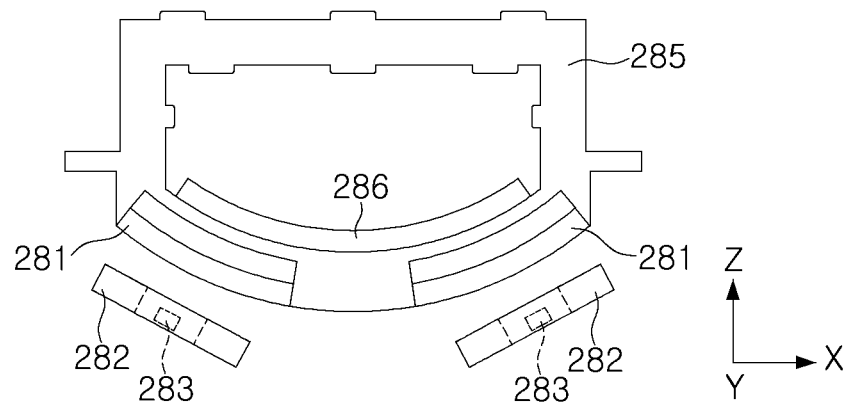
FIG. 20C shows a third-type pitch driver according to an example embodiment.

Referring to FIGS. 20A through 20C, the second OIS magnet 281 in an example embodiment may have a curved shape. In an example embodiment, the second OIS magnet 281 may have an arc shape, and its curvature center may be positioned opposite to the second OIS coil 282. For example, the curvature center of the second OIS magnet 281 may be positioned on the first axis A1 or close to the first axis A1.

In an example embodiment, the second OIS magnet 281 may include two magnets. Referring to FIG. 20C, a first sub-magnet and a second sub-magnet may be disposed to face the second OIS coil 282, respectively.

In an example embodiment, the second OIS coil 282 may be positioned to face the second OIS magnet 281. Referring to FIG. 20C, the second OIS coil 282 in an example embodiment may include two coils. Referring to FIG. 20B, the second OIS coil 282 in an example embodiment may include a single coil. In this case, the single coil may be larger than the coil of FIG. 20C.

Figure 21:
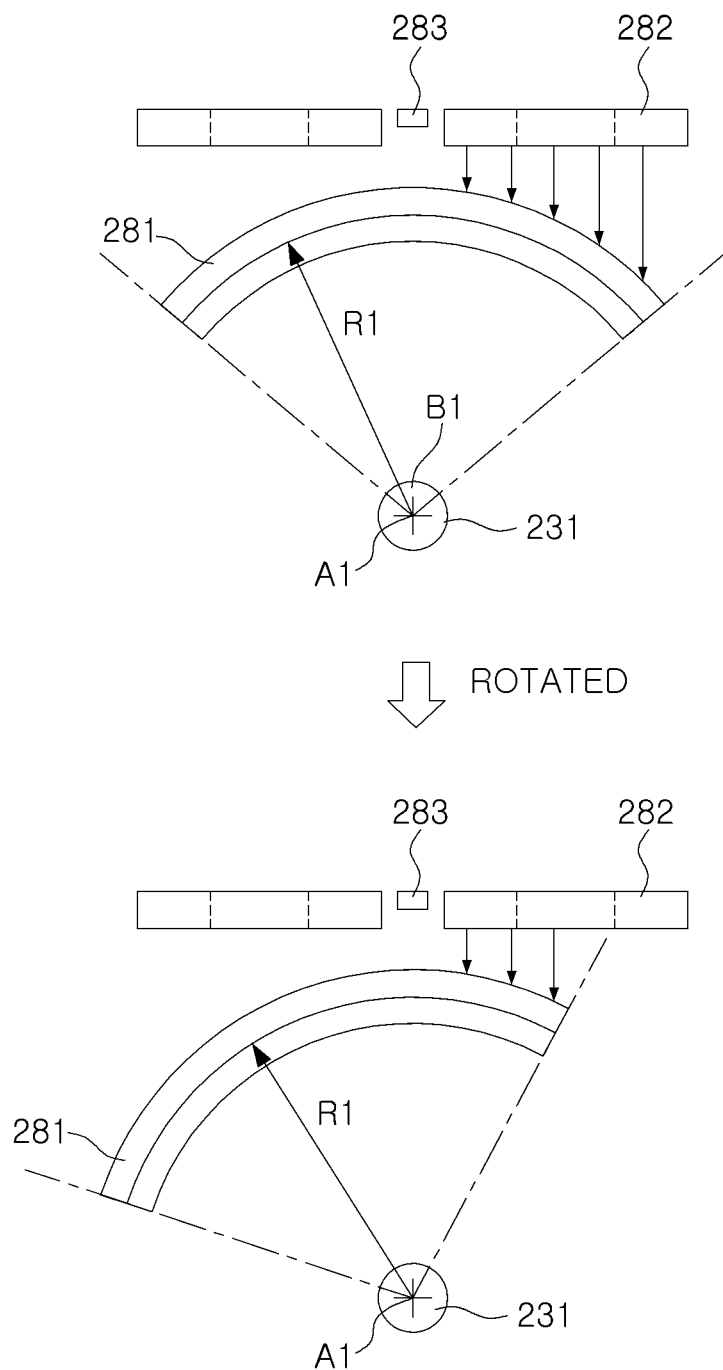
FIG. 21 shows the pitch driver when a magnet for driving a pitch has its curvature center disposed on a yaw axis in an example embodiment.
Figure 22:
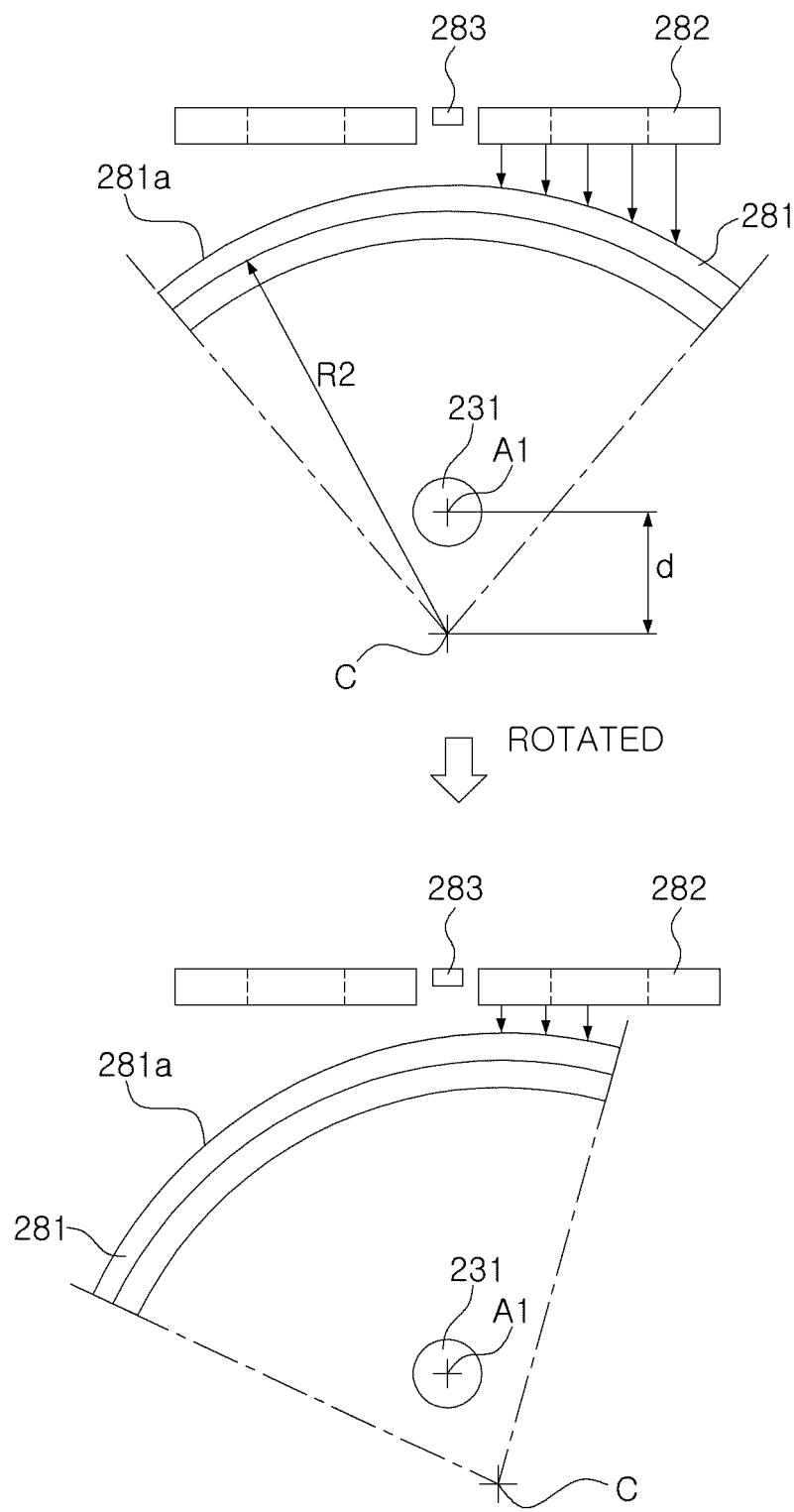
FIG. 22 is a view illustrating the pitch driver when the curvature center of the magnet for driving a pitch is positioned spaced apart from the yaw axis in an example embodiment.

FIG. 21 shows the pitch driver when a magnet for driving a pitch has its curvature center disposed on a yaw axis in an example embodiment; and FIG. 22 is a view illustrating the pitch driver when the curvature center of the magnet for driving a pitch is positioned spaced apart from the yaw axis in an example embodiment.

In an example embodiment, the curvature center B1 of the second OIS magnet 281 may be positioned on the first axis A1. In this case, a curvature radius R1 of the second OIS magnet 281 may be defined as a distance between the first axis A1 and the second OIS magnet 281, and a distance between the second OIS magnet 281 and the second OIS coil 282 may be constant while the carrier 220 is rotated.

In an example embodiment, the second OIS magnet 281 may include a cylindrical surface 281a having a central axis C spaced apart from and parallel to the first axis A1. In this case, a curvature radius R2 of the second OIS magnet 281 may be defined as a distance between the central axis C and the second OIS magnet 281. The central axis C may be positioned further away from the cylindrical surface 281a than the first axis A1.

In an example embodiment, the curvature center of the second OIS magnet 281 may be positioned farther than the first axis A1 from the second OIS magnet 281. For example, referring to FIG. 22, the curvature center of the second OIS magnet 281 in the neutral state may be "d" away from the first axis A1 in the +Z direction. An area of the second OIS magnet 281, facing the second OIS coil 282, may be decreased when the carrier 220 is rotated counterclockwise around the main ball member 231 (or the first axis A1). However, a right side of the second OIS magnet 281 may be closer to the second OIS coil 282, thus a sufficient pitch driving force may be secured.

As set forth above, according to one or more example embodiments of the present disclosure, it is possible to easily stabilize an image not only when taking the picture of a still subject, but also when capturing the video of a moving subject.

In addition, one or more example embodiments of the present disclosure may also provide the folded module that may track a moving subject, and the camera module including the same.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A folded module comprising:
a housing;
a carrier disposed in the housing; and
a rotation holder disposed on the carrier and on which a reflective member is disposed,
wherein the carrier is configured to be rotatable about a first axis perpendicular to an optical axis, and the rotation holder is configured to be rotatable about a second axis perpendicular to the optical axis and the first axis,
wherein the housing and the carrier each comprise an auxiliary guide groove and the auxiliary guide groove in the housing is positioned to face the auxiliary guide groove in the carrier, and
wherein a center line of each of the auxiliary guide grooves in a longitudinal direction is arc-shaped having a radius about the first axis, and a portion of the center line is disposed outside of the carrier.

2. The folded module of claim 1, further comprising a first ball group disposed between the housing and the carrier and configured to support rotation of the carrier about the first axis,
wherein the first ball group comprises a main ball member to form the first axis, and a plurality of auxiliary ball members disposed away from the first axis, and
wherein the plurality of auxiliary ball members are partially accommodated in the auxiliary guide grooves.

3. The folded module of claim 1, further comprising a second ball group disposed between the carrier and the rotation holder and configured to support rotation of the rotation holder about the second axis,
wherein the second ball group comprises a plurality of ball members spaced apart in a second axis direction to form the second axis.

4. The folded module of claim 2, wherein one side and the other side of the carrier opposing in an optical axis direction with the first axis therebetween is approximately parallel to the second axis.

5. The folded module of claim 2, wherein a portion of the carrier disposed between the plurality of auxiliary ball members has cut-shaped in a direction perpendicular to the optical axis.

6. The folded module of claim 1, further comprising:
a first OIS magnet disposed on a bottom surface of the carrier;
a first OIS coil disposed on a bottom surface of the housing to oppose the first OIS magnet;
a second OIS magnet disposed on a side surface of the rotation holder facing a side surface of the housing; and
a second OIS coil disposed on the side surface of the housing to oppose the second OIS magnet.

7. A camera module comprising:
a housing;
a folded module disposed in the housing and configured to convert a light incident to an optical axis direction; and
a lens module disposed in the housing and including at least one lens disposed along the optical axis,
wherein the folded module comprising:
a carrier disposed on the housing; and
a rotation holder disposed on the carrier and on which a reflective member is disposed,
wherein the carrier is configured to be rotatable about a first axis perpendicular to an optical axis, and the rotation holder is configured to be rotatable about a second axis perpendicular to the optical axis and the first axis,
wherein the housing and the carrier each comprise an auxiliary guide groove and the auxiliary guide groove in the housing is positioned to face the auxiliary guide groove in the carrier, and
wherein a center line of each of the auxiliary guide grooves in a longitudinal direction is arc-shaped having a radius about the first axis, and a portion of the center line is disposed outside of the carrier.

8. The camera module of claim 7, further comprising a first ball group disposed between the housing and the carrier and configured to support rotation of the carrier about the first axis,
wherein the first ball group comprises a main ball member to form the first axis, and a plurality of auxiliary ball members disposed away from the first axis, AND
wherein the plurality of auxiliary ball members are partially accommodated in the auxiliary guide grooves.

9. The camera module of claim 7, further comprising a second ball group disposed between the carrier and the rotation holder and configured to support rotation of the rotation holder about the second axis,
wherein the second ball group comprises a plurality of ball members spaced apart in a second axis direction to form the second axis.

10. The camera module of claim 8, wherein one side and the other side of the carrier opposing in an optical axis direction with the first axis therebetween is approximately parallel to the second axis.

11. The camera module of claim 8, wherein a portion of the carrier disposed between the plurality of auxiliary ball members has cut-shaped in a direction perpendicular to the optical axis.

12. The camera module of claim 7, further comprising:
a first OIS magnet disposed on a bottom surface of the carrier;
a first OIS coil disposed on a bottom surface of the housing to oppose the first OIS magnet;
a second OIS magnet disposed on a side surface of the rotation holder facing a side surface of the housing; and
a second OIS coil disposed on the side surface of the housing to oppose the second OIS magnet.

* * * * *